United States Patent
Jung et al.

(10) Patent No.: US 12,250,269 B2
(45) Date of Patent: Mar. 11, 2025

(54) ELECTRONIC DEVICE AND METHOD OF FORMING WI-FI PEER TO PEER (P2P) GROUP

(71) Applicant: Samsung Electronics Co., Ltd., Suwon-si (KR)

(72) Inventors: Buseop Jung, Suwon-si (KR); Beomjip Kim, Suwon-si (KR); Hakkwan Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/485,503

(22) Filed: Oct. 12, 2023

(65) Prior Publication Data

US 2024/0048613 A1     Feb. 8, 2024

Related U.S. Application Data

(63) Continuation of application No. PCT/KR2023/008937, filed on Jun. 27, 2023.

(30) Foreign Application Priority Data

Aug. 8, 2022  (KR) .................. 10-2022-0098722
Sep. 22, 2022  (KR) .................. 10-2022-0119750

(51) Int. Cl.
   *H04L 67/104*     (2022.01)
   *H04W 48/10*     (2009.01)

(52) U.S. Cl.
   CPC ......... *H04L 67/1051* (2013.01); *H04W 48/10* (2013.01)

(58) Field of Classification Search
   CPC ............... H04L 67/1051; H04L 67/104; H04L 67/1044; H04W 48/10
   See application file for complete search history.

(56) References Cited

U.S. PATENT DOCUMENTS

| | | |
|---|---|---|
| 9,007,959 B2 | 4/2015 | Verma et al. |
| 9,474,094 B2 | 10/2016 | Qi et al. |
| 9,998,535 B2 | 6/2018 | Liu et al. |
| 10,051,441 B2 | 8/2018 | Smadi et al. |
| 10,841,165 B2 | 11/2020 | Iwami et al. |
| 2013/0148545 A1* | 6/2013 | Jung ................ H04W 48/16 370/255 |

(Continued)

FOREIGN PATENT DOCUMENTS

| | | |
|---|---|---|
| KR | 20130016609 A | 2/2013 |
| KR | 101826327 B1 | 2/2018 |

(Continued)

*Primary Examiner* — Chris Parry
*Assistant Examiner* — Steven C Nguyen
(74) *Attorney, Agent, or Firm* — Nixon & Vanderhye, P.C.

(57) ABSTRACT

An example method of forming a Wi-Fi P2P group of an electronic device includes obtaining information for Wi-Fi P2P connection to a second external electronic device while the electronic device forms a first P2P group with a first external electronic device through a Wi-Fi P2P connection and generating a second P2P group with the second external electronic device by obtaining a group owner (GO) permission while maintaining the first P2P group based on the information and a role of the electronic device in the first P2P group.

16 Claims, 14 Drawing Sheets

(56) References Cited

U.S. PATENT DOCUMENTS

| | | | | |
|---|---|---|---|---|
| 2014/0078928 A1* | 3/2014 | Verma | ............... | H04L 67/1051 |
| | | | | 370/254 |
| 2015/0043484 A1* | 2/2015 | Jung | ............... | H04W 76/14 |
| | | | | 370/329 |
| 2015/0195686 A1* | 7/2015 | Yu | ............... | H04W 4/80 |
| | | | | 370/338 |
| 2015/0289191 A1* | 10/2015 | Wang | ............... | H04W 40/02 |
| | | | | 455/445 |
| 2016/0021586 A1 | 1/2016 | Akhi et al. | | |
| 2016/0135017 A1* | 5/2016 | Wu | ............... | H04W 56/001 |
| | | | | 370/350 |

FOREIGN PATENT DOCUMENTS

| | | |
|---|---|---|
| KR | 101867089 B1 | 6/2018 |
| KR | 20200069532 A | 6/2020 |

\* cited by examiner

ELECTRONIC DEVICE AND METHOD OF FORMING WI-FI PEER TO PEER (P2P) GROUP

CROSS-REFERENCE TO RELATED APPLICATIONS

This application is a continuation application of International Application No. PCT/KR2023/008937 designating the United States, filed on Jun. 27, 2023, in the Korean Intellectual Property Receiving Office and claiming priority to Korean Patent Application No. 10-2022-0098722, filed on Aug. 8, 2022 and Korean Patent Application No. 10-2022-0119750, filed on Sep. 22, 2022 in the Korean Intellectual Property Office, the disclosures of each of which are incorporated by reference herein in their entireties.

BACKGROUND

1. Field

The disclosure relates to an electronic device and a method of forming a wireless fidelity (Wi-Fi) peer to peer (P2P) group.

2. Description of Related Art

Wireless fidelity (Wi-Fi) peer to peer (P2P) refers to a technique of directly connecting an electronic device to another electronic device using a Wi-Fi interface without a medium (e.g., an access point) of an infrastructure network.

Electronic devices may form a Wi-Fi P2P network by forming a P2P group. The P2P group may be configured in an electronic device functioning as a group owner and an electronic device functioning as a group client.

SUMMARY

According to an example embodiment, an electronic device includes at least one wireless communication module (including, e.g., wireless communication circuitry) configured to transmit and receive a wireless signal, at least one processor operatively connected with the wireless communication module, and a memory electrically connected to the processor and configured to store instructions executable by the processor. When the instructions are executed by the processor, the processor is configured to obtain information for a wireless fidelity (Wi-Fi) peer to peer (P2P) connection to a second external electronic device while the electronic device forms a first P2P group with a first external electronic device through a Wi-Fi P2P connection, and generate a second P2P group with the second external electronic device 401 by obtaining a group owner (GO) permission while maintaining the first P2P group based on the information and a role of the electronic device in the first P2P group.

According to an example embodiment, a method of forming a Wi-Fi P2P group of an electronic device includes obtaining information for a Wi-Fi P2P connection to a second external electronic device while the electronic device forms a first P2P group with a first external electronic device through a Wi-Fi P2P connection. The method includes generating a second P2P group with the second external electronic device by obtaining a group owner (GO) permission while maintaining the first P2P group based on the information and a role of the electronic device in the first P2P group.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
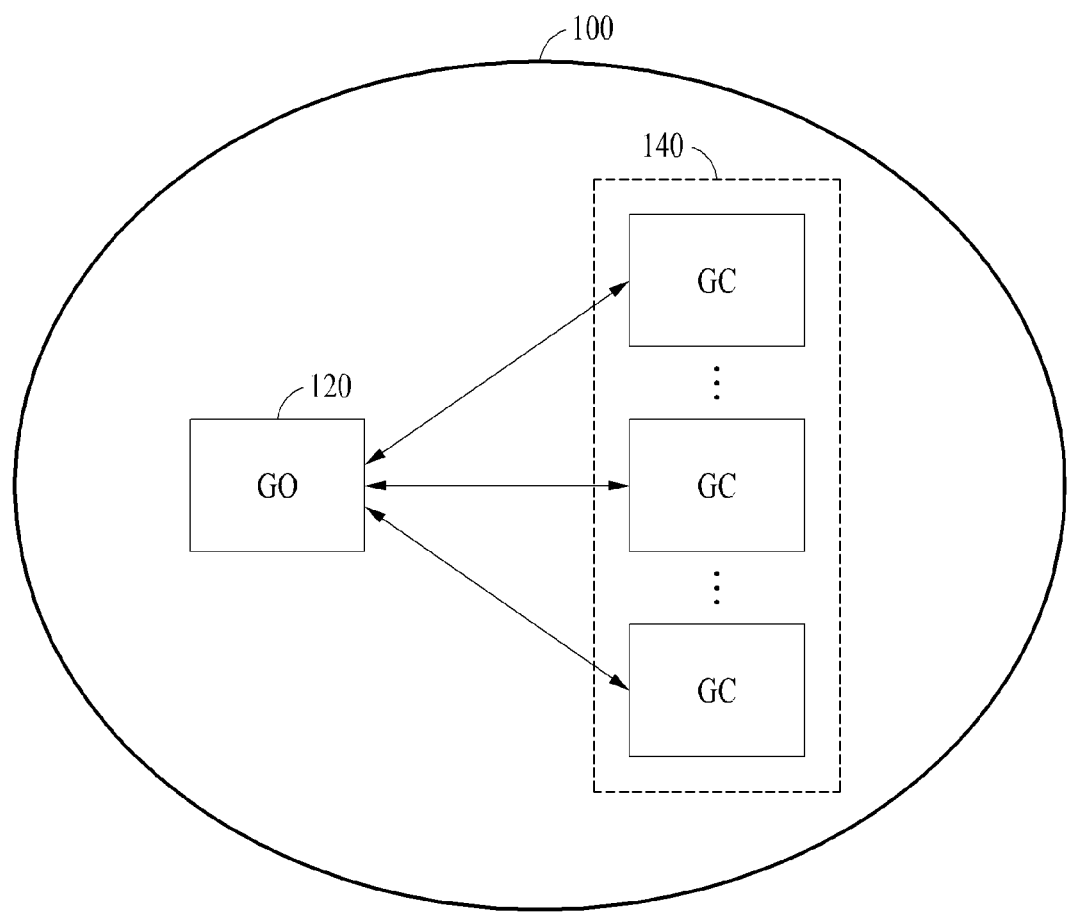
FIG. 1 is an example of a peer to peer (P2P) group in a wireless fidelity (Wi-Fi) P2P network.

Hereinafter, embodiments will be described in detail with reference to the accompanying drawings. When describing the examples with reference to the accompanying drawings, like reference numerals may refer to like components and a repeated description related thereto may be omitted.

FIG. 1 is an example of a peer to peer (P2P) group in a wireless fidelity (Wi-Fi) P2P network according to an embodiment.

Referring to FIG. 1, an electronic device may, for example, be a device for supporting Wi-Fi direct, such as a smartphone, a tablet, a computer device, or a wearable device. Electronic devices may form a Wi-Fi P2P network by forming a P2P group 100. In the P2P group 100, each electronic device may function as a group owner (GO) 120 or a group client 140. The GO 120 may perform the same or similar function(s) to an access point (e.g., an access point in a wireless local area network (WLAN)). The GC 140 may perform the same or similar function(s) to a station (e.g., a station in a WLAN). A single P2P group 100 may include one GO 120 and at least one GC 140. In one P2P group, one GO 120 may be connected to one or more GCs 140. The number of GCs 140 connected to the GO 120 may be based on the capability of the GO 120.

Figure 2:
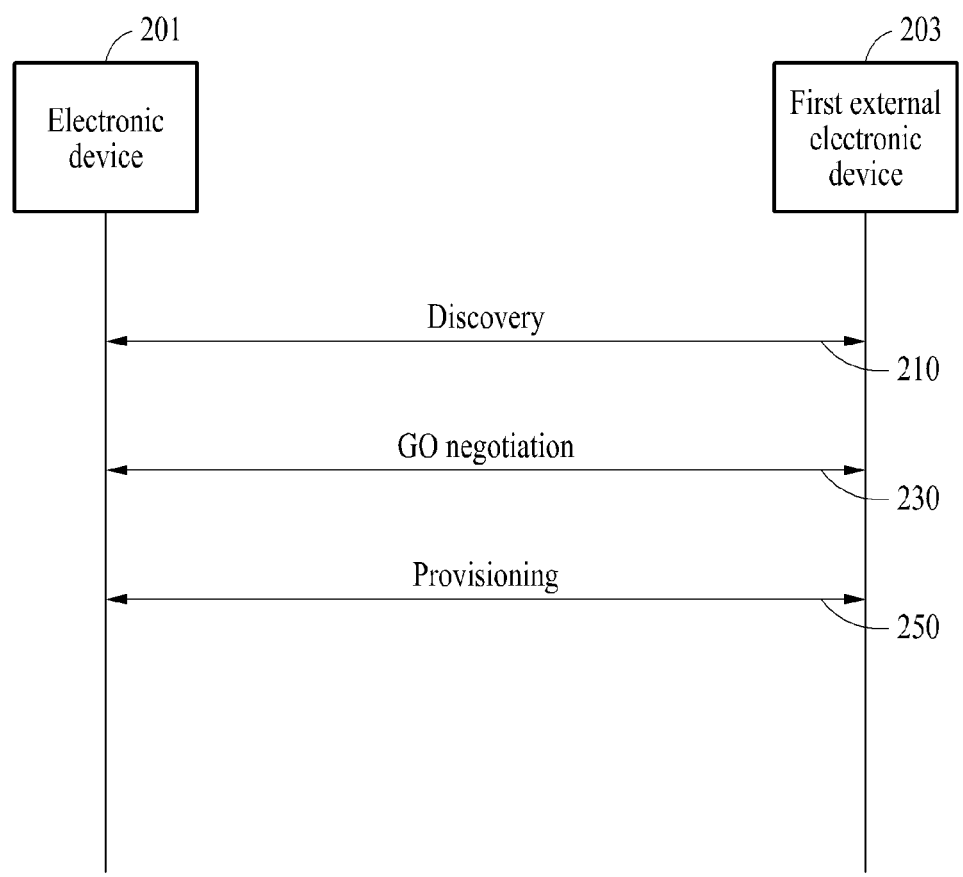
FIG. 2 is a diagram illustrating an example procedure of forming a P2P group according to an embodiment.

FIG. 2 is a diagram illustrating an example procedure of forming a P2P group according to an embodiment.

Referring to FIG. 2, an electronic device 201 and a first external electronic device 203 may perform a procedure for generating a P2P group (e.g., the P2P group 100 of FIG. 1).

Operations 210, 230, and 250 may be an example for describing a process of forming the P2P group 100, but the disclosure is not limited to these operations. Some operations may be omitted or another operation(s) may be added thereto. For example, operation 230 may be omitted when the electronic device 201 obtains a GO permission through an autonomous GO mode.

In operation 210, the electronic device 201 may perform discovery for searching for the first external electronic device 203. The electronic device 201 may search for the first external electronic device 203 by exchanging a probe request frame for a probe response frame with the first external electronic device 203. To perform discovery, the electronic device 201 and the first external electronic device 203 may repeat a search state and a listen state. Specifically, the electronic device 201 may search for the first external electronic device 203 by transmitting a probe request frame in the search state. The electronic device 201 may limit a search range for a rapid search. For example, the electronic device 201 may limit the search range to a social channel (e.g., channel 1, channel 6, or channel 11). In the listen state, the first external electronic device 203 may receive a probe request frame of the electronic device 201 and may transmit a probe response frame to the electronic device 201. When the first external electronic device 203 is identified, the electronic device 201 may perform provision discovery. The provision discovery may, for example, refer to informing a user (e.g., a user of the electronic device 201 or the first external electronic device 203) of a connection attempt between the electronic device 201 and the first external electronic device 203. For example, the electronic device 201 may transmit a provision discovery request frame to the first external electronic device 203. The first external electronic device 203 may request triggering (e.g., confirmation of a connection request) to a user (e.g., a user of the first external electronic device 203). When an input (e.g., a triggering input) is received from a user, the first external electronic device 203 may transmit a provision discovery response frame to the electronic device 201.

In operation 230, the electronic device 201 and the first external electronic device 203 may negotiate information of an attribute (e.g., a temporary group or a persistent group) and a channel (e.g., a P2P group operation channel) of the P2P group 100 required to connect (e.g., Wi-Fi P2P connection) therebetween by performing GO negotiation. The electronic device 201 and the first external electronic device 203 may perform GO negotiation by exchanging a GO negotiation request frame, a GO negotiation response frame, and a GO negotiation confirmation frame. A detailed description of GO negotiation is provided with reference to FIG. 3.

In operation 250, the electronic device 201 and the first external electronic device 203 may perform provisioning. The electronic device 201 and the first external electronic device 203 may exchange credentials through provisioning. The credentials may, for example, include cryptographic information (e.g., an authentication type, an encryption type, a network key, and/or an service set identifier (SSID)). After provisioning is completed, the electronic device 201 and the first external electronic device 203 may form the P2P group 100.

Figure 3:
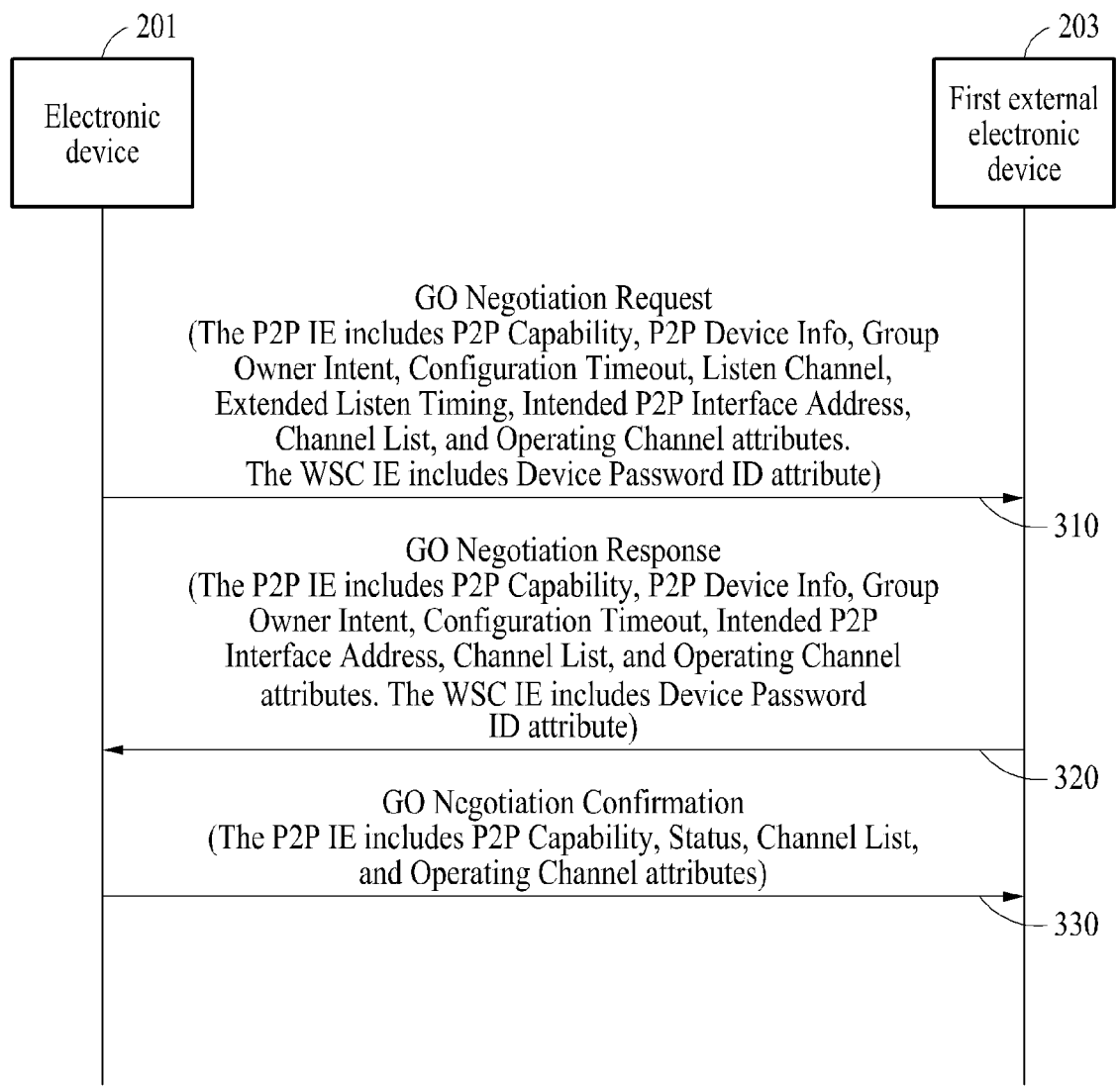
FIG. 3 is a diagram illustrating an example group owner (GO) negotiation according to an embodiment.

FIG. 3 is a diagram illustrating an example GO negotiation according to an embodiment. FIG. 3 may, for example, be a diagram for providing a detailed description of operation 230 of GO negotiation of FIG. 2.

Referring to FIG. 3, the electronic device 201 and the first external electronic device 203 may exchange a GO negotiation request frame, a GO negotiation response frame, and a GO negotiation confirmation frame.

In operation 310, the electronic device 201 may transmit a GO negotiation request frame to the first external electronic device 203. The GO negotiation request frame may include information (e.g., P2P IE information and WSC IE information). The P2P IE information (or field) may include information such as a P2P capability, P2P device information, a GO intent, a configuration timeout, a listen channel, an extended listen timing, an intended P2P interface address, a channel list, and an operating channel attribute(s). The WSC IE information may include information such as a device password identification (ID) attribute(s). The device password ID attribute(s) may, for example, include an ID, a manufacturer, a model name, a model number, a serial number, and/or a device name.

In operation 320, after receiving the GO negotiation request frame of the electronic device 201, the first external electronic device 203 may transmit a GO negotiation response frame to the electronic device 201. The GO negotiation response frame may include information (e.g., P2P IE information and WSC IE information). The electronic device 201 and the first external electronic device 203 may negotiate a GO permission based on information (e.g., a GO intent) included in a frame (e.g., a GO negotiation request frame and a GO negotiation response frame). For example, any one (e.g., an electronic device having a larger GO intent value) of the electronic device 201 and the first external electronic device 203 may operate as a GO (e.g., the GO 120 of FIG. 1). The electronic device 201 and the first external electronic device 203 may elevate the GO intent value to obtain the GO permission.

In operation 330, the electronic device 201 may transmit a GO negotiation confirmation frame to the first external electronic device 203. The GO negotiation confirmation frame may include information (e.g., P2P IE information).

After the GO negotiation is completed, one (e.g., an electronic device having a large GO intent value) of the electronic device 201 and the first external electronic device 203 may function as a GO (e.g., the GO 120 of FIG. 1) and the other one (e.g., an electronic device having a small GO intent value) may be connected to the GO 120 as a GC (e.g., the GC 140 of FIG. 1) through provisioning (e.g., provisioning performed in operation 250 of FIG. 2). However, according to Wi-Fi P2P specifications, the electronic device 201 and the first external electronic device 203 may obtain a GO permission without GO negotiation through an autonomous GO mode. The autonomous GO mode may be used for an electronic device (e.g., an access point) that always functions as the GO 120. However, when the electronic device (e.g., the electronic device 201) obtains the GO permission through the autonomous GO, the electronic device 201 may not identify a frequency capability (e.g., information of a frequency band supported by the electronic device) of a connection target device (e.g., the first external electronic device 203). According to a message exchange procedure (e.g., a message exchange procedure of FIG. 5), the electronic device 201 may obtain a frequency capability of a connection target device (e.g., the first external electronic device 203) through discovery (e.g., discovery operation 230 of FIG. 2). A detailed description of the message exchange procedure in an embodiment is provided with reference to FIG. 5.

Figure 4:
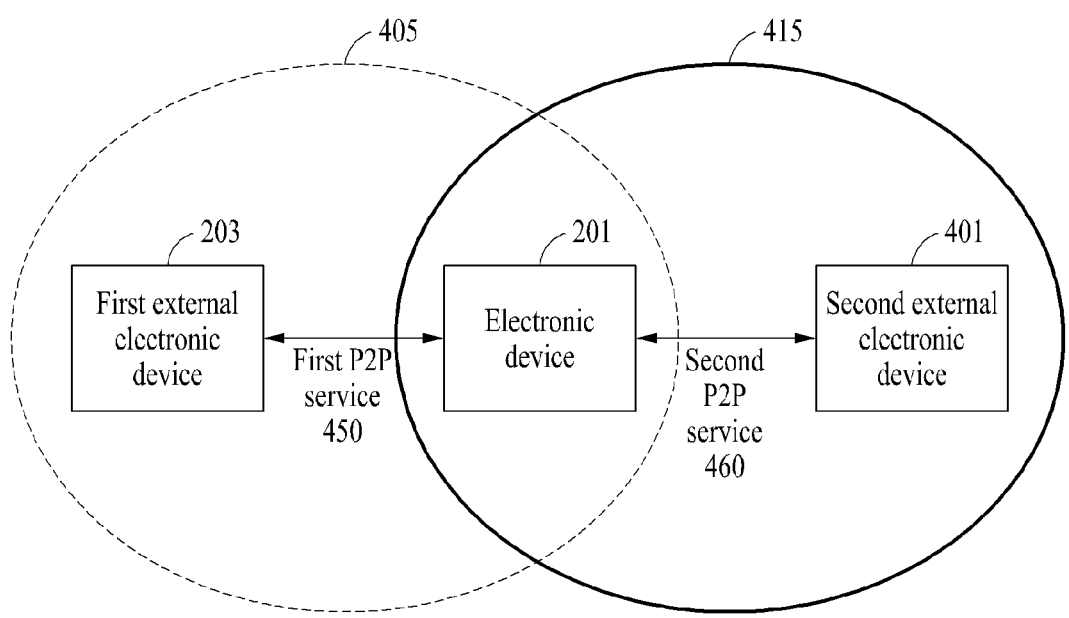
FIG. 4 is an example of an example P2P network according to an embodiment.

FIG. 4 is an example of a P2P network according to an embodiment.

Referring to FIG. 4, in an embodiment, the electronic device 201 may form a first P2P group 405 with the first external electronic device 203 through a Wi-Fi P2P connection. The electronic device 201 may provide a first P2P service 450 to a user of the electronic device 201 through the first P2P group 405. For example, the electronic device 201 may mirror a screen of the electronic device (e.g., a smartphone) on a screen of the first external electronic device 203 (e.g., a television (TV)).

While the first P2P service 450 is executed, the electronic device 201 may receive a request to execute a second P2P service 460. The second P2P service 460 may be a service executed between the electronic device 201 and a second external electronic device 401. To execute the second P2P service 460, the electronic device 201 may terminate the first P2P service 450 with the first external electronic device 203 and may execute the second P2P service 460.

In an embodiment, the electronic device 201 may simultaneously execute the first and second P2P services 450 and 460 by generating a second P2P group 415 while maintaining the first P2P group 405.

In an embodiment, the electronic device 201 may simultaneously execute the first and second P2P services 450 and 460 by connecting the second external electronic device 401 to the first P2P group 405.

Figure 5:
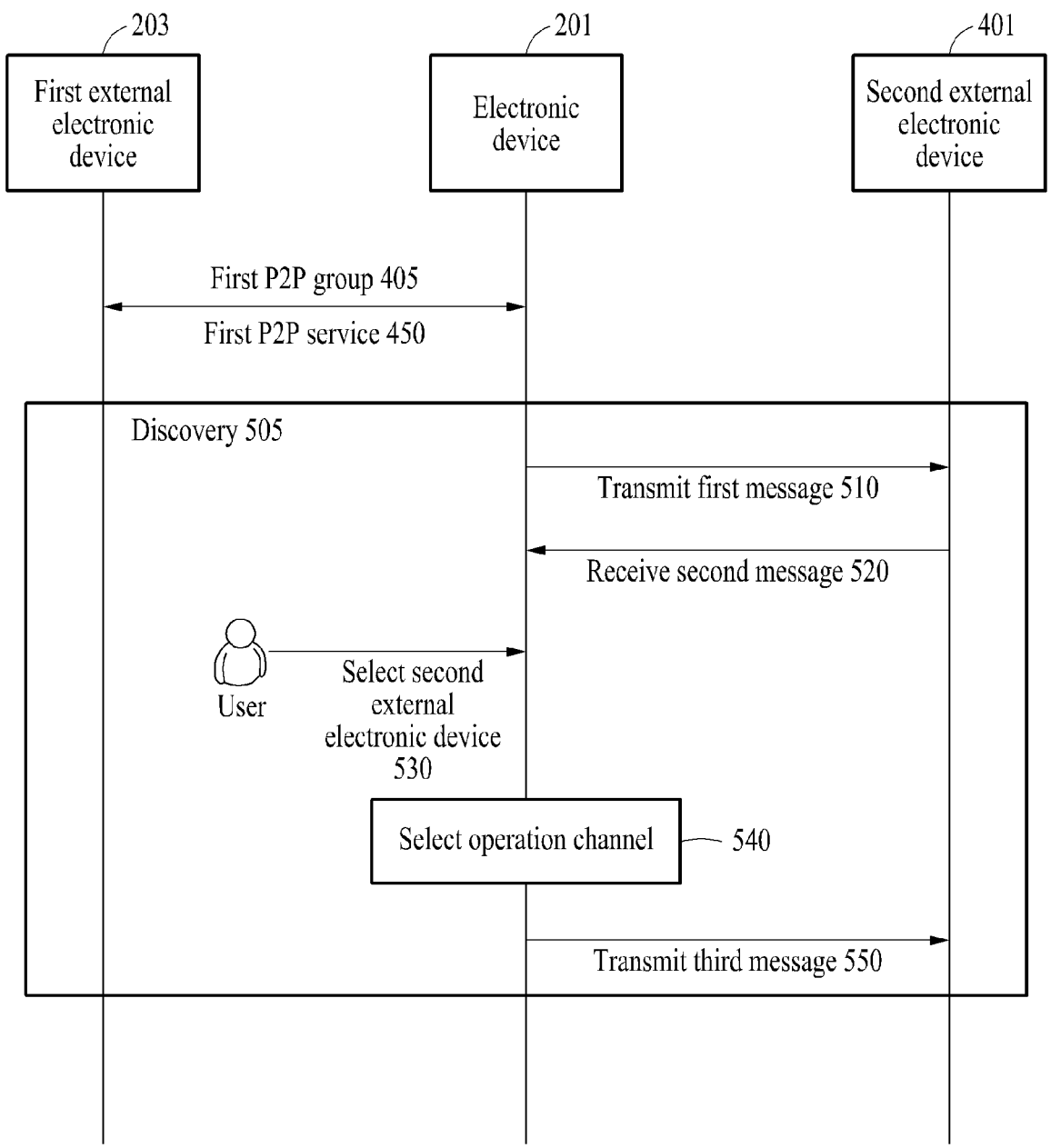
FIG. 5 is a diagram illustrating an example procedure of forming a P2P group according to an embodiment.

FIG. 5 is a diagram illustrating an example of a procedure of forming a P2P group according to an embodiment. FIG. 5 may, for example, be a diagram for providing a detailed description of a message exchange procedure among electronic devices (e.g., the electronic device 201 and the second external electronic device 401) during discovery operation 210 of FIG. 2.

Referring to FIG. 5, in an embodiment, a user of the electronic device 201 may desire to execute the second P2P service 460 while the first P2P service 450 is executed. For example, the user may attempt to transmit a file to the second external electronic device 401 while a mirroring service is executed between the electronic device 201 and the first external electronic device 203. To execute the second P2P service 460, the electronic device 201 may form a P2P group (e.g., the second P2P group 415 of FIG. 4) with the second external electronic device 401. In an embodiment, to form the second P2P group 415, the electronic device 201 may search for the second external electronic device 401 in various methods (e.g., Bluetooth low energy (BLE), Bluetooth (BT), near field communication (NFC), or P2P) during a discovery 505 (e.g., discovery performed in operation 210 of FIG. 2) process. For example, the electronic device 201 may search for the second external electronic device 401 using BLE. To search for the second external electronic device 401, the electronic device 201 may exchange a message (e.g., a BLE message) including information (e.g., a P2P address, a frequency capability, P2P group information, a dual P2P capability, an operation channel, P2P service information, and device information) with the second external electronic device 401.

In operation 510, the electronic device 201 may transmit a first message to the second external electronic device 401. The first message may include P2P service information (e.g., P2P service information for specifying the second P2P service 460 and information of the P2P service supported by the electronic device 201) and device information (e.g., information such as the name of the electronic device 201).

In operation 520, the electronic device 201 may receive a second message transmitted by the second external electronic device 401. The second message may include, for example, P2P service information (e.g., information for specifying the second P2P service 460 and information of a P2P service supported by the second external electronic device 401), device information (e.g., information such as the name of the second external electronic device 401), a P2P address (e.g., a P2P address of the second external electronic device 401), P2P group (e.g., a third P2P group 805 of FIG. 8) information, dual P2P capability information (e.g., a dual P2P capability of the second external electronic device 401), and a frequency capability (e.g., information of a frequency band supported by the second external electronic device 401).

In operation 530, a user may identify the existence of the second external electronic device 401 through the electronic device 201 and may select the second external electronic device 401. For example, the user may select (e.g., by selection from a displayed list) the second external electronic device 401 from at least one external electronic device found through the discovery operation 505 (e.g., transmission 510 of the first message) of the electronic device 201.

In operation 540, the electronic device 201 may select an operation channel for the second P2P service 460. Alternatively, the user may select an operation channel. For example, the electronic device 201 may select an operation channel based on P2P group information (e.g., operation channel information of the first P2P group 405, roles of the electronic devices 201 and 203 in the first P2P group 405, P2P addresses of the electronic devices 201 and 203) and information of a frequency band supported by both of the electronic device 201 and the second external electronic device 401. For example, when both of the electronic devices 201 and 401 support a frequency band (e.g., 5 GHz) that is higher than a frequency band (e.g., 2.4 GHz) of the operation channel of the first P2P group 405, the electronic device 201 may select a channel (e.g., an arbitrary channel) of the frequency band (e.g., a frequency band that is higher than an operation channel of the first P2P group 405) supported by both of the electronic devices 201 and 401 to be an operation channel of the second P2P group 415. For example, when the second external electronic device 401 does not support a frequency band of an operation channel of the first P2P group 405, the electronic device 201 may select a channel of a frequency band (e.g., a frequency band that is lower than an operation channel of the first P2P group 405) supported by both of the electronic devices 201 and 401 to be an operation channel of the second P2P group 415.

In operation 550, the electronic device 201 may transmit a third message to the second external electronic device 401. The third message may include a P2P address, a frequency capability (e.g., information of a frequency band supported by the electronic device 201), an operation channel, P2P group information, and dual P2P capability information (e.g., a dual P2P support capability of the electronic device 201).

In an embodiment, the P2P address may include P2P device addresses of the electronic devices 201 and 401 and/or interfaces of the electronic devices 201 and 401. For example, when the electronic device 201 uses the first P2P group 405 for the second P2P service 460 (e.g., when the electronic device 201 is a GO in the first P2P group 405 and the second external electronic device 401 is connected to the first P2P group 405 as a GC), the electronic device 201 may transmit a P2P address of the electronic device 201 that is used in the first P2P group 405 to the second external electronic device 401. For example, when the electronic device 201 generates the second P2P group 415 by obtaining a GO permission for the second P2P service 460 (e.g., when the electronic device 201 is a GC in the first P2P group 405), the electronic device 201 may transmit a P2P address that is different from the P2P address of the electronic device 201 used in the first P2P group 405 to the second external electronic device 401.

In an embodiment, the frequency band capability may include information of a P2P frequency band (e.g., 2.4 GHz, 5 GHz, 6 GHz, and/or 60 GHz) supported by the electronic devices 201 and 401. The electronic devices 201 and 401 may exchange dual band simultaneous (DBS), which is supportable without performance degradation, and/or real simultaneous dual band (RSDB) information with the frequency capability. For example, the electronic devices 201 and 401 may exchange the frequency capability and DBS and RSDB information using 3 bits as shown below. However, the example shown below is merely an example and the disclosure is not limited thereto.

Bit Configuration
- 2.4 GHz only→000
- 2.4 GHz, 5 GHz, non-DBS→001
- 2.4 GHz, DBS→010
- 5 GHz, 6 GHz, non-DBS→011
- 5 GHz, 6 GHz, DBS→100

Figure 8:
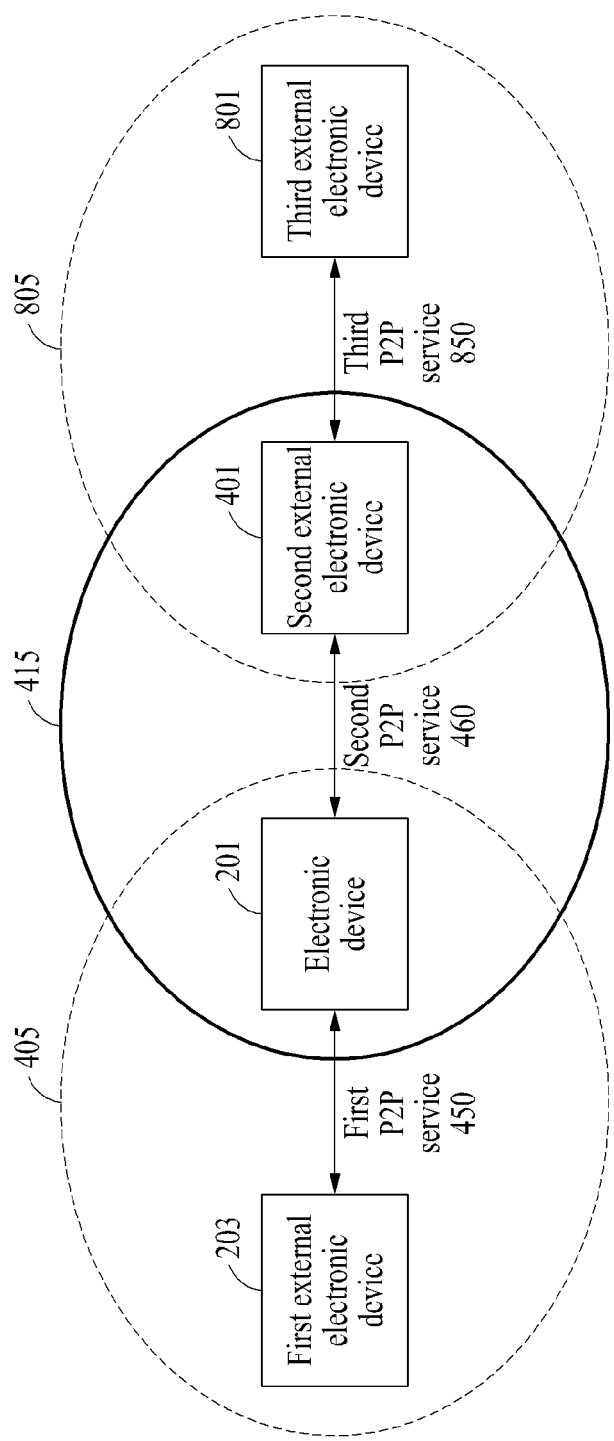
FIG. 8 is a diagram illustrating an example of a P2P network according to an embodiment.

In an embodiment, the P2P group information may include information on a P2P group (e.g., the first P2P group 405 and the third P2P group 805 of FIG. 8) that is formed before exchanging messages (e.g., the first to third messages) of the electronic devices 201 and 401. For example, the P2P group information may include information such as IDs of the P2P groups 405 and 805, roles of the electronic devices 201, 203, 401, and 801 in the P2P groups 405 and 805, and/or operation channels of the P2P groups 405 and 805.

In an embodiment, when the electronic devices 201 and 401 already formed a dual P2P group, the electronic devices 201 and 401 may exchange information on the dual P2P group with each other.

Figure 6A:
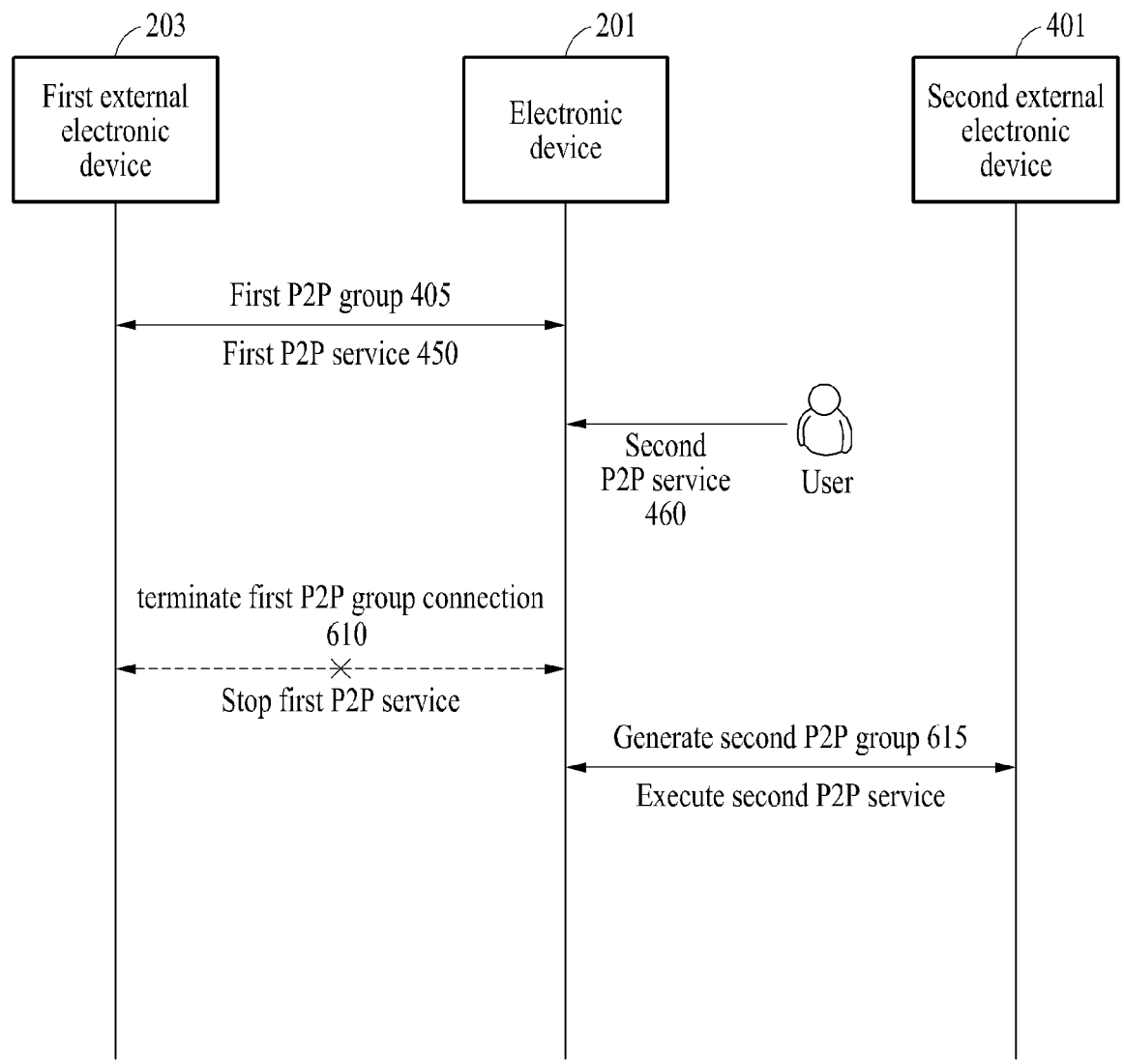
FIG. 6A is a diagram illustrating an example of a method of forming a P2P group in a P2P network.

FIG. 6A is a diagram illustrating an example of a method of forming a P2P group in a P2P network. FIG. 6A may, for example, be a diagram for describing an example of a method of forming a P2P group in the P2P network illustrated in FIG. 4.

Referring to FIG. 6A, in an embodiment, a user of the electronic device 201 may desire to execute the second P2P service 460 while the first P2P service 450 is executed. The electronic device 201 may terminate the first P2P service 450 and may execute the second P2P service 460.

In operation 610, the electronic device 201 may terminate the first P2P service 450 and may terminate connection of the first P2P group 405.

In operation 615, the electronic device 201 may form a P2P group (e.g., the second P2P group 415 of FIG. 4) through a P2P group formation procedure (e.g., the P2P group formation procedure of FIG. 2). The electronic device 201 may execute the second P2P service 460 through the second P2P group 415.

However, as described above, when the electronic device 201 terminates connection of the first P2P group 405 to execute the second P2P service 460, the electronic device 201 may not simultaneously execute the P2P services 450 and 460.

Figure 6B:
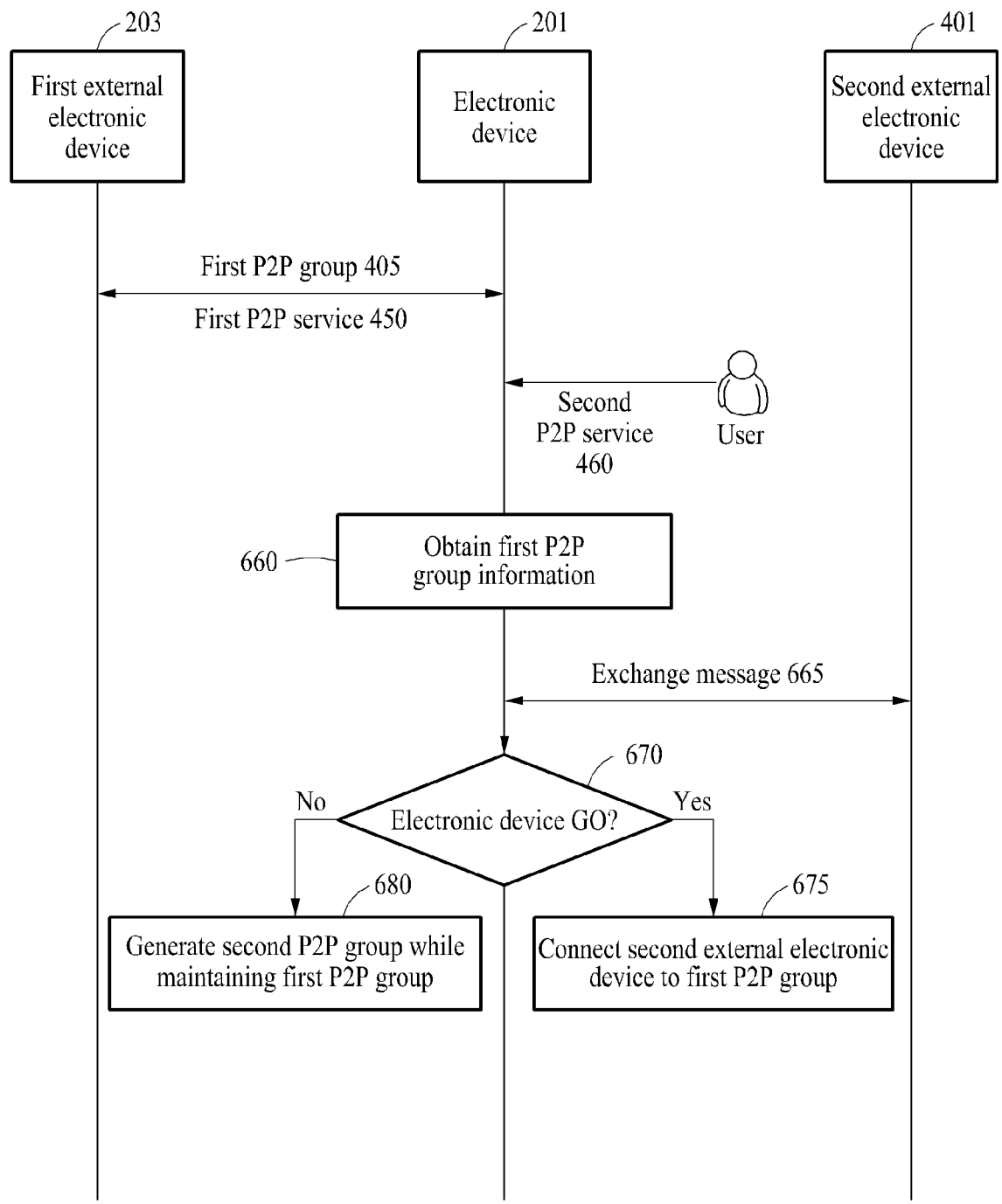
FIG. 6B is a diagram illustrating an example of a method of forming a P2P group in a P2P network.

FIG. 6B is a diagram illustrating an example of a method of forming a P2P group in a P2P network. FIG. 6B may, for example, be a diagram for describing a method of forming a P2P group in the P2P network illustrated in FIG. 4.

Referring to FIG. 6B, in an embodiment, a user of the electronic device 201 may desire to execute the second P2P service 460 while the first P2P service 450 is executed. In an embodiment, the electronic device 201 may simultaneously execute the P2P services 450 and 460. To simultaneously execute the P2P services 450 and 460, the electronic device 201 may group the electronic devices 201 and 401 based on a role of the electronic device 201 in the first P2P group 405. For example, the electronic device 201 may generate a P2P group (e.g., the second P2P group 415) while maintaining the first P2P group 405. For example, the electronic device 201 may connect the second external electronic device 401 to the first P2P group 405.

Operations 660, 665, 670, and 675, 680 may be performed sequentially, but examples are not limited thereto. An order of operations 660, 665, 670, and 675, 680 may change or at least two of the operations may be performed in parallel. For example, operation 665 (e.g., selection of an operation channel performed in operation 540 and transmission of the third message performed in operation 550 of FIG. 5) may be performed after operations 675, 680 or in parallel with operations 675, 680.

In operation 660, the electronic device 201 may obtain information of the first P2P group 405 (e.g., a role of the electronic device 201 in the first P2P group 405, information of an operation channel of the first P2P group 405, a P2P address of the electronic device 201, and/or an ID of the first P2P group 405).

In operation 665, the electronic device 201 may exchange a message with the second external electronic device 401 through a message exchange procedure (e.g., the message exchange procedure of FIG. 5). The electronic device 201 may obtain information (e.g., information of the P2P service supported by the second external electronic device 401, information of the second P2P service 460, information of the second external electronic device 401, the P2P address of the second external electronic device 401, dual P2P capability of the second external electronic device 401, and information of the frequency band supported by the second external electronic device 401) included in the message.

In operation 670, the electronic device 201 may identify the role (e.g., a GO or a GC) of the electronic device 201 in the first P2P group 405.

In operation 675, when the role of the electronic device 201 is a GO in the first P2P group 405, the electronic device 201 may connect the second external electronic device 401 to the first P2P group 405. For example, in the first P2P group 405, the electronic device 201 may operate as a GO and the external electronic devices 203 and 401 may operate as a GC (e.g., the GC of FIG. 1). The electronic device 201 may simultaneously execute the P2P services 450 and 460 through the first P2P group 405. The electronic device 201 may map the second external electronic device 401 based on information (e.g., the P2P address of the second external electronic device 401 obtained through the message exchange procedure of FIG. 5) of the second external electronic device 401 obtained through discovery (e.g., discovery of operation 210 of FIG. 2) for connecting the second external electronic device 401 to the first P2P group 405. After mapping the second external electronic device 401, the electronic device 201 may transmit an invitation request message (e.g., a message including information of the first P2P group 405) to the second external electronic device 401. As the second external electronic device 401 receives the invitation request message and transmits an invitation response message, the second external electronic device 401 may be connected to the electronic device 201 that is a GO of the first P2P group 405. On the other hand, the second external electronic device 401 may be connected to the electronic device 201 that is a GO of the first P2P group 405 by mapping the electronic device 201 based on information (e.g., information of the P2P address of the electronic device 201 and/or information of the first P2P group 405 obtained through the message exchange procedure of FIG. 5) obtained through discovery. To improve the search speed, the second external electronic device 401 may intensively search for an operation channel of the first P2P group 405 transmitted by the electronic device 201.

In operation 680, when the role of the electronic device 201 is the GC 140 in the first P2P group 405, the electronic device 201 may generate the second P2P group 415 by obtaining a GO permission while maintaining the first P2P group 405. For example, the electronic device 201 may operate as the GO 120 in the second P2P group 415. The electronic device 201 may execute the first P2P service 450 through the first P2P group 405 and may execute the second P2P service 460 through the second P2P group 415. The electronic device 201 may generate the second P2P group 415 through the P2P group formation procedure (e.g., the P2P group formation procedure of FIGS. 2 and 3). For example, the electronic device 201 may obtain a GO permission by elevating a GO intent value and may generate the second P2P group 415. For example, the electronic device 201 may generate the second P2P group 415 by obtaining the GO permission without GO negotiation (e.g., the GO negotiation of FIG. 3) through an autonomous GO mode. When the second P2P group 415 is generated without GO negotiation, the electronic device 201 may minimize quality degradation of the second P2P service 460 and may improve a connection (e.g., Wi-Fi P2P connection) speed by omitting an off-channel operation (e.g., an off-channel operation for GO negotiation). To mitigate performance degradation due to antenna switching, the electronic device 201 may select an operation channel of the second P2P group 415 to be the same as the operation channel of the first P2P group 405. The electronic device 201 may transmit a message (e.g., the third message transmitted in operation 550 of FIG. 5) including the selected operation channel of the first P2P group 405 to the second external electronic device 401. When the second P2P group 415 is generated through the autonomous GO mode, the electronic device 201 may select an operation channel of the second P2P group 415 based on the frequency capability included in a message (e.g., the message of FIG. 5) that is exchanged through discovery.

In an embodiment, the electronic device 201 may obtain a GO permission while maintaining the first P2P group 405 based on the role of the electronic device 201 in the first P2P group 405 and may simultaneously execute the P2P services 450 and 460 by generating the second P2P group 415.

In an embodiment, the electronic devices 201 and 401 may rapidly generate the second P2P group 415 by exchanging frequency capabilities of the electronic devices 201 and 401 during the discovery process.

Figure 7:
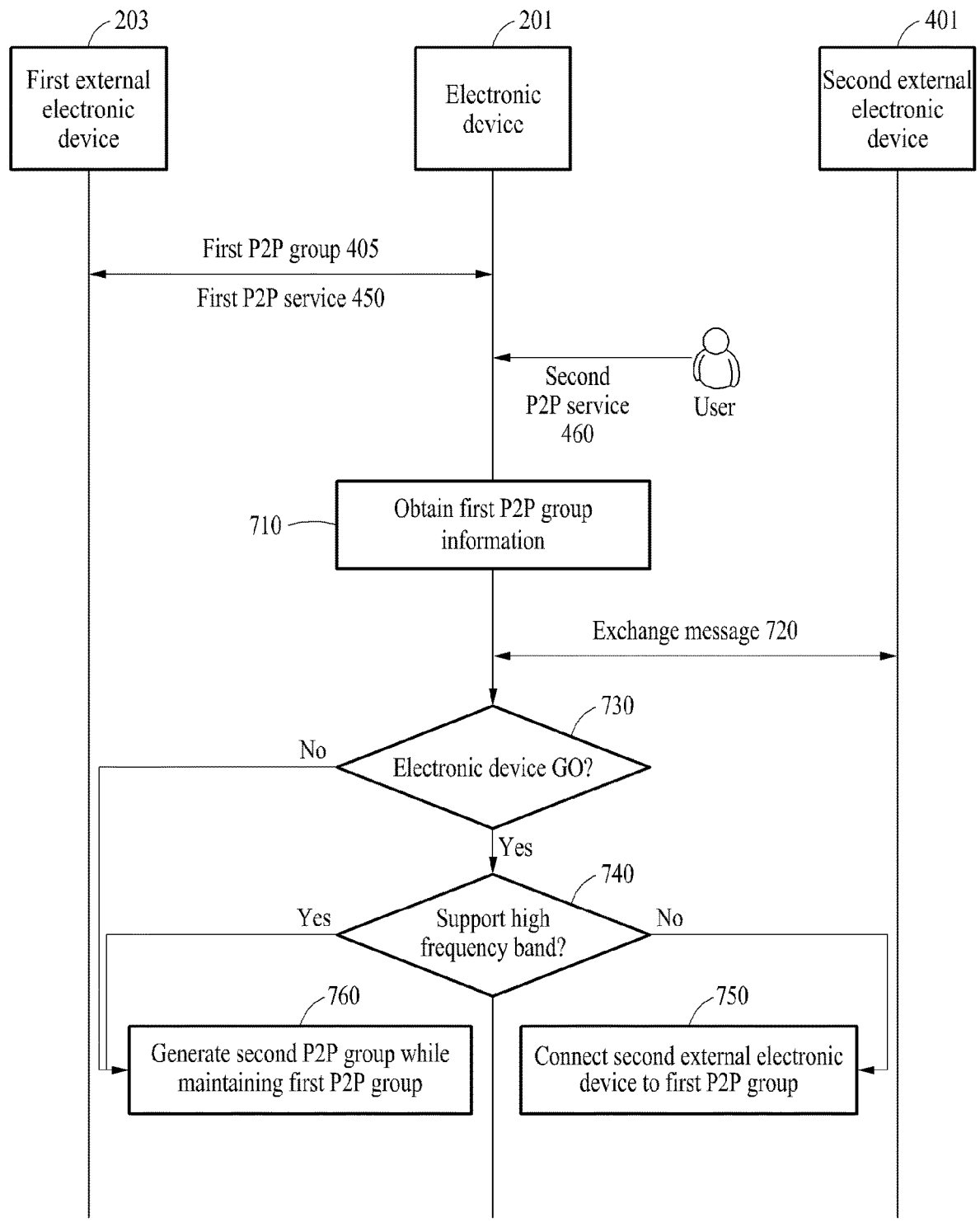
FIG. 7 is a diagram illustrating an example of a method of forming a P2P group in a P2P network.

FIG. 7 is a diagram illustrating an example of a method of forming a P2P group in a P2P network. FIG. 7 may, for example, be a diagram for describing a method of forming a P2P group in the P2P network illustrated in FIG. 4.

Referring to FIG. 7, in an embodiment, a user of the electronic device 201 may desire to execute the second P2P service 460 while the first P2P service 450 is executed between the electronic device 201 and the first external electronic device 203. The second P2P service 460 may be a service executed between the electronic device 201 and the second external electronic device 401. In an embodiment, the electronic device 201 may simultaneously execute the P2P services 450 and 460. To simultaneously execute the P2P services 450 and 460, the electronic device 201 may group the electronic devices 201 and 401 based on the role of the electronic device 201 in the first P2P group 405 and a frequency band supported by both of the electronic devices 201 and 401.

Operations 710, 720, 730, 740, and 750, 760 may be performed sequentially, but examples are not limited thereto. An order of the operations may change or at least two of the operations may be performed in parallel. For example, after operations 750, 760 are performed, a portion of operation 720 (e.g., selection of an operation channel performed in operation 540 and transmission of the third message performed in operation 550 of FIG. 5) may be performed.

Operations 710, 720, and 730 may be substantially the same as operations 660, 665, and 670 of FIG. 6B. Accordingly, a description thereof is not repeated.

In operation 740, if the electronic device 201 is determined to be a GO in operation 730, the electronic device 201 may identify frequency capabilities of the electronic devices 201 and 401. For example, the electronic device 201 may determine whether the electronic devices 201 and 401 support a frequency band (e.g., 5 GHz) that is higher than a frequency band (e.g., 2.4 GHz) of an operation channel of the first P2P group 405.

In operation 750, when the role of the electronic device 201 in the first P2P group 405 is a GO and the electronic devices 201 and 401 do not support a frequency band that is higher than the operation channel of the first P2P group 405, the electronic device 201 may connect the second external electronic device 401 to the first P2P group 405. The procedure for connecting the second external electronic device 401 to the first P2P group 405 may be substantially the same as the connection procedure performed in operation 675 of FIG. 6. Accordingly, a description thereof is not repeated.

In operation 730, when the role of the electronic device 201 is a GC in the first P2P group 405, in operation 760, the electronic device 201 may generate the second P2P group 415 by obtaining a GO permission while maintaining the first P2P group 405. When the role of the electronic device 201 in the first P2P group 405 is a GO in operation 730 and both of the electronic devices 201 and 401 support a frequency band that is higher than an operation channel of the first P2P group 405 in operation 740, the electronic device 201 may generate the second P2P group 415 while maintaining the first P2P group 405. The electronic device 201 may select a frequency band (e.g., a frequency band that is higher than the operation channel of the first P2P group 405) supported by both of the electronic devices 201 and 401 to be an operation channel of the second P2P group 415. For example, when the frequency band of the first P2P group 405 is 2.4 GHz and the electronic devices 201 and 401 support 5 GHz, the electronic device 201 may select (or set) a 5 GHz channel (e.g., an arbitrary channel) to be the operation channel of the second P2P group 415. As a frequency band of an operation channel (e.g., operation channels of the P2P groups 405 and 415) increases, the execution speed of a P2P service (e.g., the P2P services 450 and 460) may improve. The procedure for generating the second P2P group 415 of the electronic device 201 may be substantially the same as the procedure for generating the second P2P group 415 in operation 680 of FIG. 6. Accordingly, a description thereof is not repeated.

In an embodiment, the electronic device 201 may simultaneously execute the P2P services 450 and 460 at a high speed and high quality by generating the second P2P group 415 based on the frequency band supported by the electronic devices 201 and 401.

FIG. 8 is a diagram illustrating an example of a P2P network according to an embodiment.

Referring to FIG. 8, in an embodiment, the electronic device 201 and the first external electronic device 203 may be executing the first P2P service 450 through the first P2P group 405. In addition, external electronic devices (e.g., the second external electronic device 401 and the third external electronic device 801) may be executing a third P2P service 850 through a third P2P group 805. In an embodiment, the electronic device 201 may receive a request to execute the second P2P service 460 from a user while the P2P services 450 and 850 are executed. The second P2P service 460 may be a service executed between the electronic device 201 and the second external electronic device 401. To execute the second P2P service 460, the electronic device 201 may terminate the first P2P service 450 with the first external electronic device 203 and may execute the second P2P service 460.

In an embodiment, the electronic device 201 may simultaneously execute the P2P services 450 and 460 by generating the second P2P group 415 with the second external electronic device 401 while maintaining the first P2P group 405 with the first external electronic device 203.

In an embodiment, the electronic device 201 may simultaneously execute the P2P services 450 and 460 by joining the second external electronic device 401 to the first P2P group 405.

Figure 9:
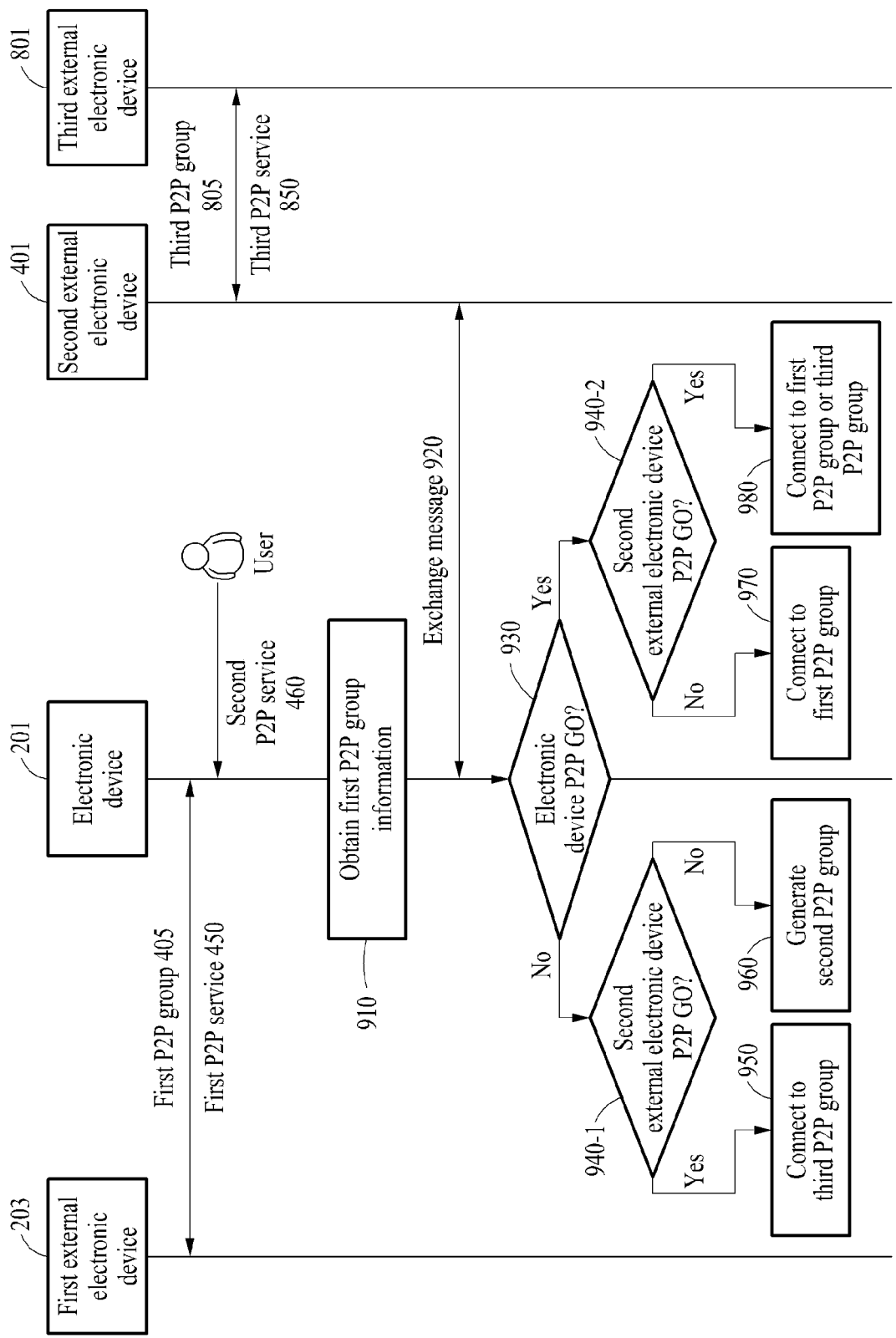
FIG. 9 is a diagram illustrating an example of a method of forming a P2P group in a P2P network.

FIG. 9 is a diagram illustrating an example of a method of forming a P2P group in a P2P network. FIG. 9 may, for example, be a diagram for describing a method of forming a P2P group in the P2P network illustrated in FIG. 8.

Referring to FIG. 9, in an embodiment, a user of the electronic device 201 may desire to execute the second P2P service 460 while P2P services (e.g., the first P2P service 450 and the third P2P service 850) are executed. In an embodiment, the electronic device 201 may simultaneously execute the P2P services 450 and 460. To simultaneously execute the P2P services 450 and 460, the electronic device 201 may group the electronic devices 201 and 401 based on the role of the electronic device 201 in the first P2P group 405 and the role of the second external electronic device 401 in the third P2P group 805.

The operation in FIG. 9 may be performed sequentially, but examples are not limited thereto. An order of the operations may change or at least two of the operations may be performed in parallel. For example, after operations 950, 960 or 970, 980 are performed, a portion of operation 920 (e.g., selection of an operation channel performed in operation 540 and transmission of the third message performed in operation 550 of FIG. 5) may be performed.

In operation 910, the electronic device 201 may obtain information of the first P2P group 405. Operation 910 may be substantially the same as operation 660 of FIG. 6. Accordingly, a description thereof is not repeated.

In operation 920, the electronic device 201 may exchange a message with the second external electronic device 401 through a message exchange procedure (e.g., the message exchange procedure of FIG. 5). The electronic device 201 may obtain information (e.g., information of the P2P service supported by the second external electronic device 401, information of the second P2P service 460, information of the second external electronic device 401, the P2P address of the second external electronic device 401, dual P2P capability of the second external electronic device 401, information of the frequency band supported by the second external electronic device 401, and/or information of the third P2P group 805) included in the message.

In operation 930, the electronic device 201 may identify a role (e.g., a GO or a GC) of the electronic device 201 in the first P2P group 405.

In operations 940-1 and 940-2, the electronic device 201 may identify the role (e.g., a GO or a GC) of the second external electronic device 401 in the third P2P group 805.

In operation 950, when the role of the electronic device 201 in the first P2P group 405 is a GC and the role of the second external electronic device 401 in the third P2P group 805 is a GO, the electronic device 201 may be connected to the third P2P group 805. For example, in the third P2P group 805, the electronic device 201 may operate as a GC and the second external electronic device 401 may operate as a GO. The electronic device 201 may execute the first P2P service 450 with the first external electronic device 203 through the first P2P group 405 and may execute the second P2P service 460 with the second external electronic device 401 through the third P2P group 805. The procedure for connecting the electronic device 201 to the third P2P group 805 may be substantially the same as the connection procedure performed in operation 675 of FIG. 6. Accordingly, a description thereof is not repeated. In an embodiment, the electronic device 201 may simultaneously execute the P2P services 450 and 460 by generating the second P2P group (e.g., the second P2P group 415 of FIG. 8) by obtaining a GO permission without being connected to the third P2P group 805. The electronic device 201 may operate as a GC in the first P2P group 405 and may operate as a GO in the second P2P group 415. For example, the electronic device 201 may generate the second P2P group 415 based on an operation channel (e.g., a frequency band of an operation channel) of the P2P groups 405 and 805 and a frequency band supported by both of the electronic devices 201 and 401. Specifically, when the electronic devices 201 and 401 support a frequency band that is higher than an operation channel of the third P2P group 805, the electronic device 201 may generate the second P2P group 415 with the second external electronic device 401. The electronic device 201 may select a channel of a frequency band (e.g., a frequency band that is higher than the operation channel of the P2P group 805) supported by both of the electronic devices 201 and 401 as an operation channel of the second P2P group 415. The electronic device 201 may execute the first P2P service 450 with the first external electronic device 203 through the first P2P group 405. The electronic device 201 may execute the second P2P service 460 with the second external electronic device 401 through the second P2P group 415. The procedure for generating the second P2P group 415 of the electronic device 201 may be substantially the same as the procedure for generating the second P2P group 415 performed in operation 680 of FIG. 6. Accordingly, a description thereof is not repeated.

In operation 960, when the role of the electronic device 201 in the first P2P group 405 is a GC and the role of the second external electronic device 401 in the third P2P group 805 is a GC, the electronic device 201 may obtain a GO permission while maintaining the first P2P group 405 and may generate the second P2P group 415. For example, the electronic device 201 may operate as a GC in the first P2P group 405 and may operate as a GO in the second P2P group 415. The electronic device 201 may execute the first P2P service 450 with the first external electronic device 203 through the first P2P group 405. The electronic device 201 may execute the second P2P service 460 with the second external electronic device 401 through the second P2P group 415. The procedure for generating the second P2P group 415 of the electronic device 201 may be substantially the same as the procedure for generating the second P2P group 415 in operation 680 of FIG. 6. Accordingly, a description thereof is not repeated.

In operation 970, when the role of the electronic device 201 in the first P2P group 405 is a GO and the role of the second external electronic device 401 in the third P2P group 805 is a GC, the electronic device 201 may connect the second external electronic device 401 to the first P2P group 405. For example, in the first P2P group 405, the electronic device 201 may operate as a GO and the second external electronic device 401 may operate as a GC. The procedure for connecting the second external electronic device 401 to the first P2P group 405 may be substantially the same as the connection procedure performed in operation 675 of FIG. 6. Accordingly, a description thereof is not repeated.

In an embodiment, the electronic device 201 may simultaneously execute the P2P services 450 and 460 by maintaining the first P2P group 405, obtaining a GO permission, and generating the second P2P group 415. The electronic device 201 may operate as a GO in the first P2P group 405 and may operate as a GO in the second P2P group 415. For example, the electronic device 201 may generate the second P2P group 415 based on an operation channel (e.g., a frequency band of an operation channel) of the P2P groups 405 and 805 and a frequency band supported by both of the electronic devices 201 and 401. Specifically, when the electronic devices 201 and 401 support a frequency band that is higher than an operation channel of the first P2P group 405, the electronic device 201 may generate the second P2P group 415. The electronic device 201 may select a channel of a frequency band (e.g., a frequency band that is higher than the operation channel of the first P2P group 405) supported by both of the electronic devices 201 and 401 as an operation channel of the second P2P group 415. The electronic device 201 may execute the first P2P service 450 with the first external electronic device 203 through the first P2P group 405. The electronic device 201 may execute the second P2P service 460 with the second external electronic device 401 through the second P2P group 415. The procedure for generating the second P2P group 415 of the electronic device 201 may be substantially the same as the procedure for generating the second P2P group 415 in operation 680 of FIG. 6. Accordingly, a description thereof is not repeated.

In operation 980, when the role of the electronic device 201 in the first P2P group 405 is a GO and the role of the second external electronic device 401 in the third P2P group 805 is a GO, the electronic device 201 may be connected to one (e.g., a P2P group having an operation channel in a higher frequency band) of the P2P groups 405 and 805 as a GC. The electronic device 201 may execute the first P2P service 450 with the first external electronic device 203 through the first P2P group 405. The electronic device 201 may execute the second P2P service 460 through another P2P group (e.g., the first P2P group 405 or the third P2P group 805). The procedure for connecting the electronic device 201 to another P2P group (e.g., the first P2P group 405 or the third P2P group 805) may be substantially the same as the connection procedure performed in operation 675 of FIG. 6. Accordingly, a description thereof is not repeated.

In an embodiment, the electronic device 201 may simultaneously execute the P2P services 450 and 460 by generating the second P2P group 415 by obtaining a GO permission without joining another P2P group (e.g., the first P2P group 405 or the third P2P group 805). For example, the electronic device 201 may generate the second P2P group 415 based on an operation channel (e.g., a frequency band of an operation channel) of the P2P groups 405 and 805 and a frequency band supported by both of the electronic devices 201 and 401. Specifically, when the electronic devices 201 and 401 support a frequency band that is higher than operation channels of the P2P groups 405 and 805, the electronic device 201 may generate the second P2P group 415. The electronic device 201 may select a channel of a frequency band (e.g., a frequency band that is higher than the operation channels of the P2P groups 405 and 805) supported by both of the electronic devices 201 and 401 as an operation channel of the second P2P group 415. The electronic device 201 may execute the first P2P service 450 with the first external electronic device 203 through the first P2P group 405. The electronic device 201 may execute the second P2P service 460 with the second external electronic device 401 through the second P2P group 415. The procedure for generating the second P2P group 415 of the electronic device 201 may be substantially the same as the procedure for generating the second P2P group 415 in operation 680 of FIG. 6. Accordingly, a description thereof is not repeated.

Figure 10:
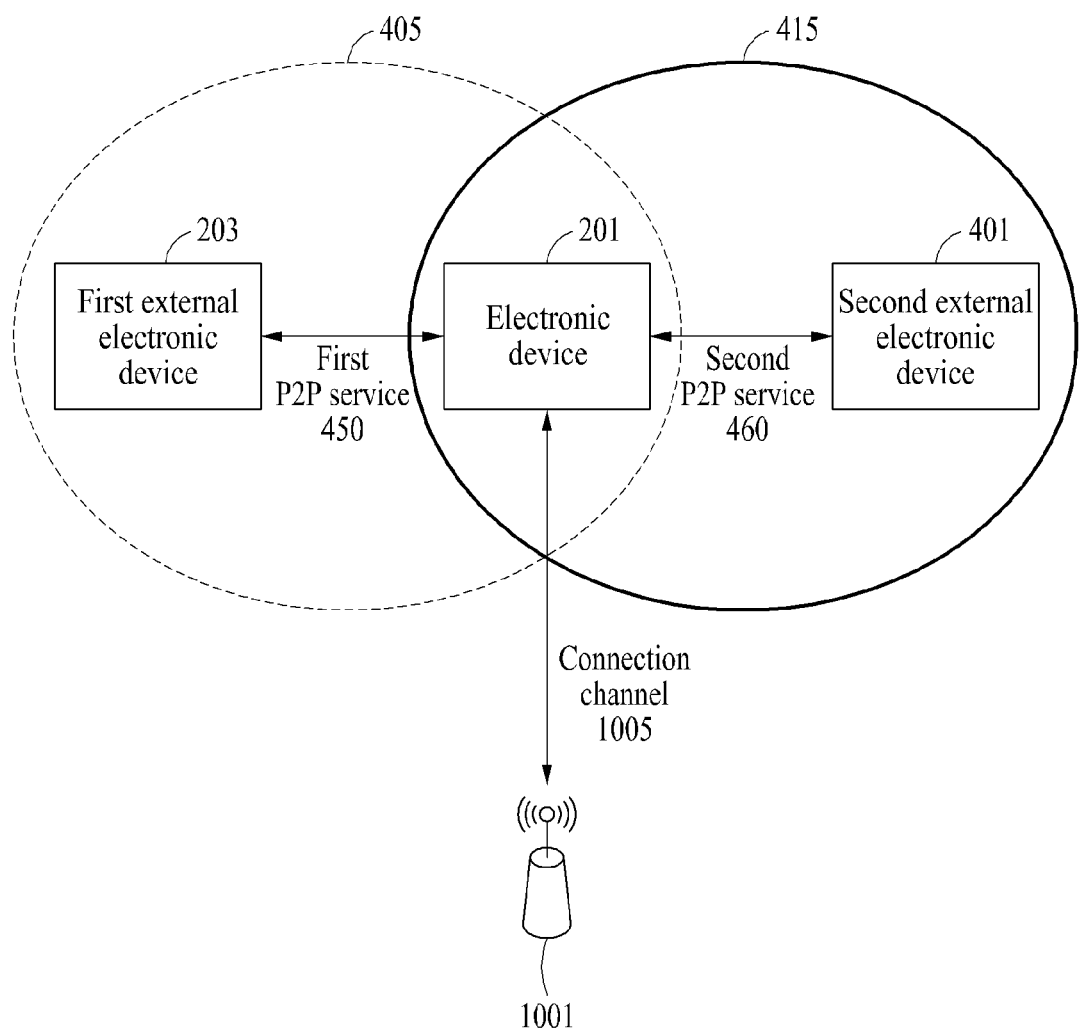
FIG. 10 is an example of a P2P network according to an embodiment.

FIG. 10 is an example of a P2P network according to an embodiment.

Figure 11:
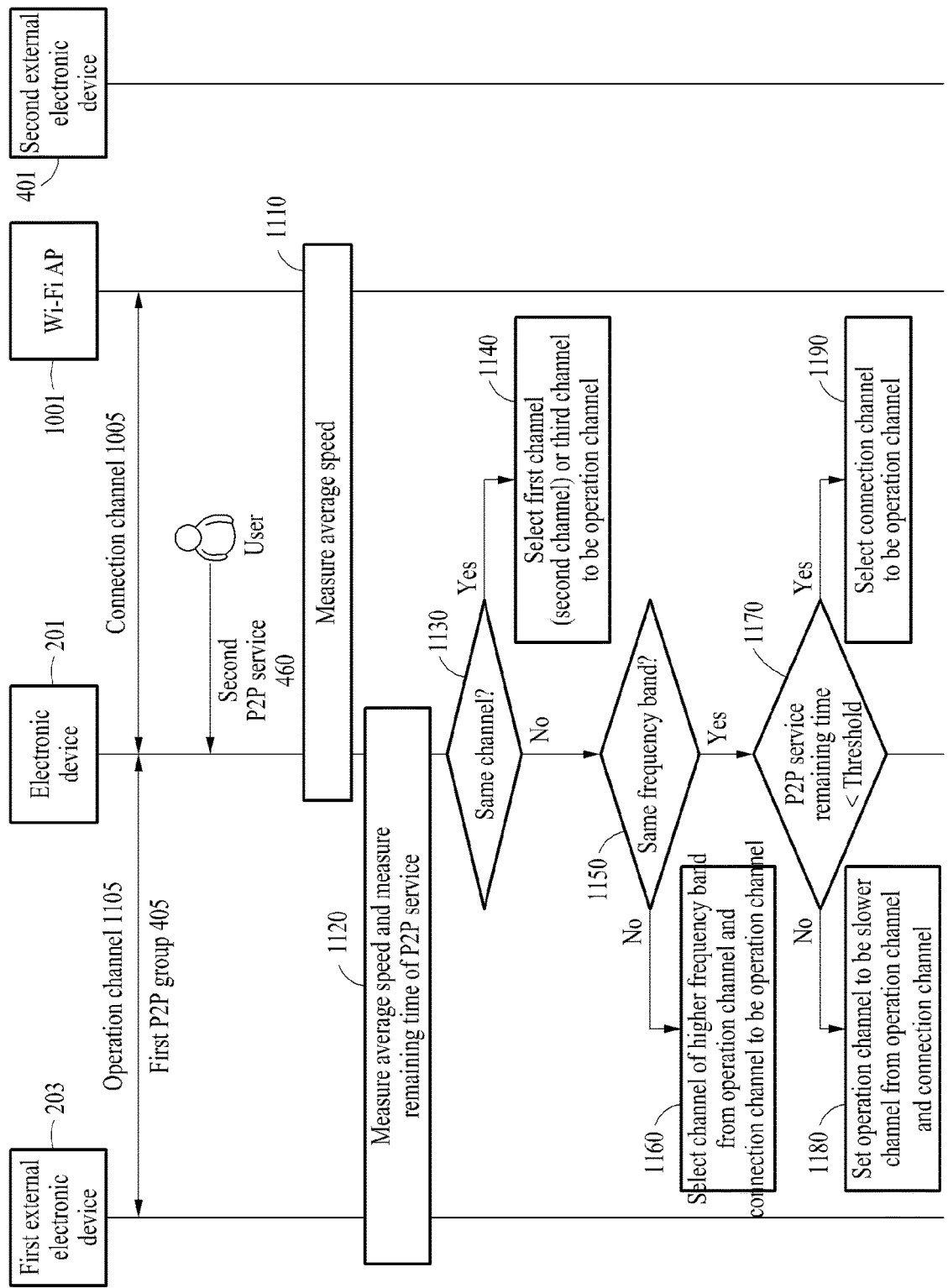
FIG. 11 is a diagram illustrating an example of a method of forming a P2P group in a P2P network.

Referring to FIG. 10, in an embodiment, the electronic device 201 and the first external electronic device 203 may be executing the first P2P service 450 through the first P2P group 405. In FIGS. 10 and 11, only a case in which the electronic device 201 operates as a GC (e.g., the GC 140 of FIG. 1) in the first P2P group 405 is considered for description. The electronic device 201 may be connected to a Wi-Fi access point 1001 via a connection channel 1005. In an embodiment, the electronic device 201 may execute the second P2P service 460 while the first P2P service 450 is executed. To execute the second P2P service 460, the electronic device 201 may terminate the first P2P service 450 with the first external electronic device 203 and may execute the second P2P service 460. In an embodiment, the electronic device 201 may simultaneously execute the P2P services 450 and 460 by generating the second P2P group 415 with the second external electronic device 401 while maintaining the first P2P group 405 with the first external electronic device 203.

FIG. 11 is a diagram illustrating an example of a method of forming a P2P group in a P2P network. FIG. 11 may, for example, be a diagram for describing a method of generating a P2P group in the P2P network illustrated in FIG. 10.

Referring to FIG. 11, in an embodiment, a user of the electronic device 201 may desire to execute the second P2P service 460 while the first P2P service 450 is executed. The first P2P service 450 may be executed between the electronic device 201 and the first external electronic device 203 and the second P2P service 460 may be executed between the electronic device 201 and the second external electronic device 401. For example, when the electronic device 201 is connected to an Wi-Fi access point (AP) via the connection channel 1005 and the first P2P service 450 is executed through an operation channel 1105, the electronic device 201 may receive a request to execute the second P2P service 460 from a user. In an embodiment, the electronic device 201 may simultaneously execute the P2P services 450 and 460. To simultaneously execute the P2P services 450 and 460, the electronic device 201 may generate a P2P group (e.g., the second P2P group 415 of FIG. 10) based on the operation channel 1105 and the connection channel 1005. The operations in FIG. 11 may be performed sequentially, but examples are not limited thereto. An order of the operations may change or at least two of the 1110 to 1190 may be performed in parallel. For example, the order of operations 1110 and 1120 may change.

In operation 1110, the electronic device 201 may measure (or determine) the speed (e.g., an average speed) of the connection channel 1005 to the Wi-Fi AP 1001.

In operation 1120, the electronic device 201 may measure (or determine) the speed (e.g., an average speed) of the operation channel 1105 and may measure (or calculate) the remaining time of a P2P service (e.g., the first P2P service 450 of FIG. 10). The remaining time of the P2P service may include the estimated remaining time to complete the P2P service. For example, when the first P2P service 450 is a file transfer service (e.g., quick share), the electronic device 201 may measure (or calculate) the estimated remaining time to complete file transfer.

In operation 1130, the electronic device 201 may determine whether the operation channel 1105 is the same as the connection channel 1005.

In operation 1140, when the operation channel 1105 is the same as the connection channel 1005, the electronic device 201 may generate the second P2P group 415 and may select the operation channel 1105 as an operation channel of the second P2P group 415.

Alternatively, when the electronic devices 201 and 401 support a frequency band that is higher than the operation channel 1105, the electronic device 201 may select a channel in the frequency band (e.g., a frequency band that is higher than the operation channel 1105) supported by both of the electronic devices 201 and 401 to be the operation channel of the second P2P group 415.

In operation 1150, when the operation channel 1105 and the connection channel 1005 are not the same channel, the electronic device 201 may determine whether the frequency band of the operation channel 1105 is the same as the frequency band of the connection channel 1005.

In operation 1160, when the operation channel 1105 and the connection channel 1005 are not the same frequency band, the electronic device 201 may generate the second P2P group 415 and may select a channel of a higher frequency band from the operation channel 1105 and the connection channel 1005 to be the operation channel of the second P2P channel 415. The electronic device 201 may set notice of absence (NoA) to simultaneously execute Wi-Fi AP connection and the P2P groups 405 and 415 and may transmit NoA information to the second external electronic device 401 through a beacon. The electronic device 201 may simultaneously perform an operation of one of Wi-Fi AP connection and the first P2P group 405 (e.g., connection using a channel of a higher frequency band) in an active section of NoA and an operation (e.g., the second P2P service 460) of the second P2P group 415. For example, the electronic device 201 may activate an operation channel of the second P2P group 415 in the active section of NoA. The electronic device 201 may execute an operation of the other one (e.g., connection using a channel of a lower frequency band) of Wi-Fi AP connection and the first P2P group 405 in an absent section of NoA. In an embodiment, the electronic device 201 may increase the execution speed of the second P2P service 460 by selecting a channel of a higher frequency band from the operation channel 1105 and the connection channel 1005 to be the operation channel of the second P2P group 415.

In operation 1170, when the operation channel 1105 and the connection channel 1005 are in the same frequency band, the electronic device 201 may compare the remaining time of the first P2P service 450 to a threshold value.

In operation 1180, when the remaining time of the first P2P service 450 is greater than (or exceeds) the threshold value, the electronic device 201 may generate the second P2P group 415 and may select a channel having a low speed (e.g., an average speed) from the operation channel 1105 and the connection channel 1005 to be an operation channel of the second P2P group 415. The electronic device 201 may set NoA to simultaneously execute Wi-Fi AP connection and the P2P groups 405 and 415 and may transmit NoA information to the second external electronic device 401 through a beacon. The electronic device 201 may simultaneously perform an operation of one of Wi-Fi AP connection and the first P2P group 405 (e.g., connection using a slower channel) in an active section of NoA and an operation (e.g., the second P2P service 460) of the second P2P group 415. For example, the electronic device 201 may activate an operation channel of the second P2P group 415 in the active section of NoA. The electronic device 201 may execute an operation of the other one (e.g., connection using a faster channel) of Wi-Fi AP connection and the first P2P group 405 in an absent section of NoA. In an embodiment, the electronic device 201 may increase the execution speed of the second P2P service 460 by selecting a slower channel from the operation channel 1105 and the connection channel 1005 to be the operation channel of the second P2P group 415.

In operation 1190, when the remaining time is less than (or less than or equal to) the threshold value, the electronic device 201 may generate the second P2P group 415 and may select the connection channel 1005 to be the operation channel of the second P2P group 415. In an embodiment, by selecting the connection channel 1005 to be the operation channel of the second P2P group 415, the electronic device 201 may configure the connection channel 1005 and the operation channel of the second P2P group 415 to be the same after terminating connection of the first P2P group 405. In an embodiment, the electronic device 201 may improve quality of service (QoS) of the second P2P service 460 and the performance of the electronic device 201 by configuring the connection channel 1005 and the operation channel of the second P2P group 415 to be the same.

Figure 12:
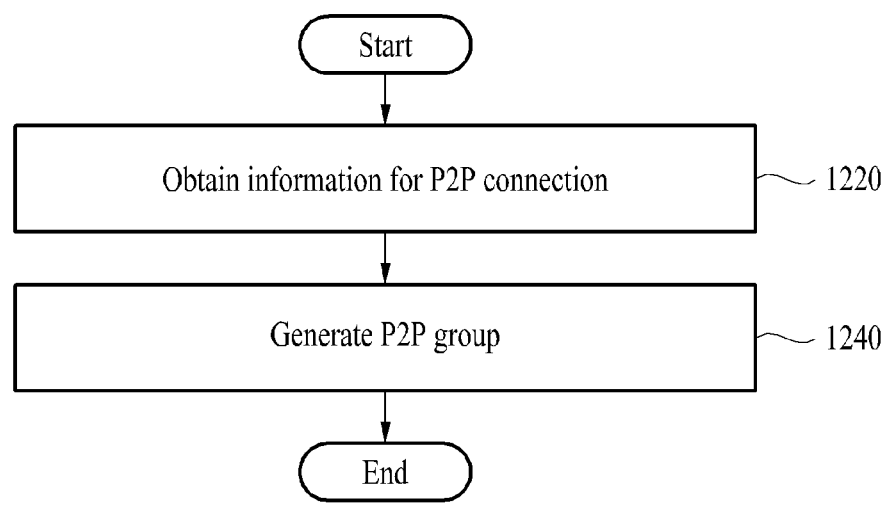
FIG. 12 is a flowchart illustrating an example method of forming a P2P group by an electronic device according to an embodiment.

FIG. 12 is a flowchart illustrating an example method of forming a P2P group by an electronic device according to an embodiment.

Referring to FIG. 12, in an embodiment, an electronic device (e.g., the electronic device 201 of FIGS. 2 to 11) may group the electronic device 201 and an external electronic device (e.g., the second external electronic device 401 of FIGS. 2 to 10) to simultaneously execute a plurality of P2P services (e.g., the first P2P service 450 and the second P2P service 460 of FIGS. 4 and 6A to 11).

In operation 1220, while the electronic device 201 forms a P2P group (e.g., the first P2P group 405 of FIGS. 2 to 11) with the external electronic device (e.g., the first external electronic device 203 of FIGS. 2 to 11) through Wi-Fi P2P connection, the electronic device 201 may obtain information (e.g., a P2P address, a frequency capability, an operation channel, P2P group information, dual P2P capability information, and/or connection channel information with a Wi-Fi AP) for P2P connection to the second external electronic device 401.

In operation 1240, the electronic device 201 may generate a P2P group (e.g., the second P2P group 415 of FIGS. 4, 8, and 10) by obtaining a GO permission while maintaining the first P2P group 405 based on the information (e.g., information obtained in operation 1220) and the role of the electronic device 201 in the first P2P group 405.

Figure 13:
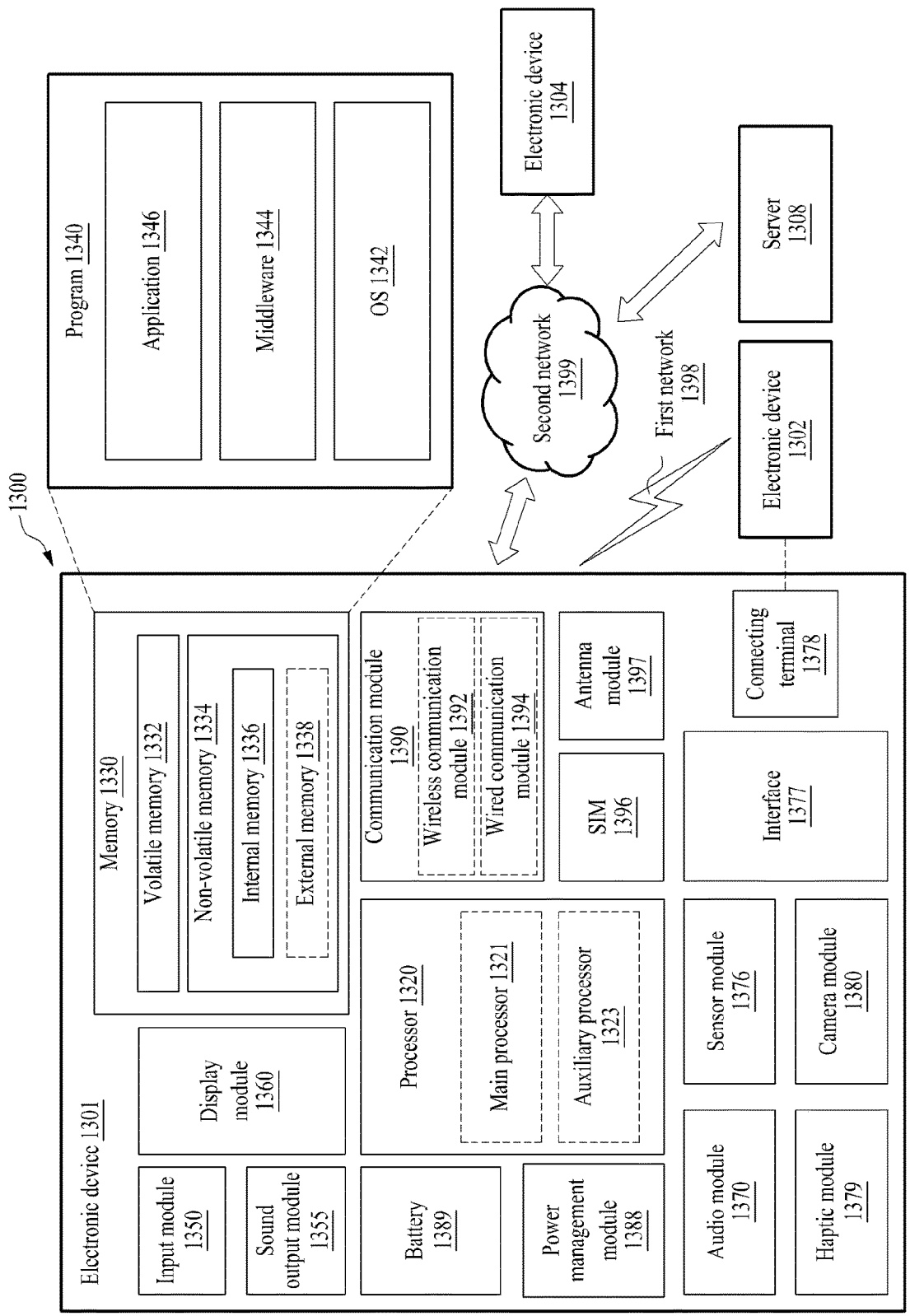
FIG. 13 is a block diagram illustrating an example electronic device in a network environment according to an embodiment.

FIG. 13 is a block diagram of an example electronic device in a network environment according to an embodiment.

Referring to FIG. 13, in an embodiment, an electronic device 1301 (e.g., the electronic device 201 of FIGS. 2 to 11) in the network environment 1300 may communicate with an electronic device 1302 via a first network 1398 (e.g., a short-range wireless communication network) or may communicate with at least one of an electronic device 1304 or a server 1308 via a second network 1399 (e.g., a long-range wireless communication network). In an embodiment, the electronic device 1301 may communicate with the electronic device 1304 via the server 1308. In an embodiment, the electronic device 1301 may include a processor 1320, a memory 1330, an input module 1350, a sound output module 1355, a display module 1360, an audio module 1370, a sensor module 1376, an interface 1377, a connecting terminal 1378, a haptic module 1379, a camera module 1380, a power management module 1388, a battery 1389, a communication module 1390, a subscriber identification module (SIM) 1396, or an antenna module 1397. In an embodiment, at least one of the components (e.g., the connecting terminal 1378) may be omitted from the electronic device 1301, or one or more other components may be added in the electronic device 1301. In an embodiment, some of the components (e.g., the sensor module 1376, the camera module 1380, or the antenna module 1397) may be integrated as a single component (e.g., the display module 1360).

The processor 1320 may execute, for example, software (e.g., a program 1340) to control at least one other component (e.g., a hardware or software component) of the electronic device 1301 connected to the processor 1320, and may perform various data processing or computation. According to an example embodiment, as at least a part of data processing or computation, the processor 1320 may store a command or data received from another component (e.g., the sensor module 1376 or the communication module 1390) in a volatile memory 1332, process the command or the data stored in the volatile memory 1332, and store resulting data in a non-volatile memory 1334. According to an example embodiment, the processor 1320 may include a main processor 1321 (e.g., a central processing unit (CPU) or an application processor (AP)), or an auxiliary processor 1323 (e.g., a graphics processing unit (GPU), a neural processing unit (NPU), an image signal processor (ISP), a sensor hub processor, or a communication processor (CP)) that is operable independently from, or in conjunction with the main processor 1321. For example, when the electronic device 1301 includes the main processor 1321 and the auxiliary processor 1323, the auxiliary processor 1323 may be adapted to consume less power than the main processor 1321 or to be specific to a specified function. The auxiliary processor 1323 may be implemented separately from the main processor 1321 or as a part of the main processor 1321.

The auxiliary processor 1323 may control at least some of functions or states related to at least one (e.g., the display module 1360, the sensor module 1376, or the communication module 1390) of the components of the electronic device 1301, instead of the main processor 1321 while the main processor 1321 is in an inactive (e.g., sleep) state or along with the main processor 1321 while the main processor 1321 is an active state (e.g., executing an application). According to an embodiment, the auxiliary processor 1323 (e.g., an ISP or a CP) may be implemented as a portion of another component (e.g., the camera module 1380 or the communication module 1390) that is functionally related to the auxiliary processor 1323. According to an embodiment, the auxiliary processor 1323 (e.g., an NPU) may include a hardware structure specified for artificial intelligence model processing. An artificial intelligence model may be generated by machine learning. Such learning may be performed by, for example, the electronic device 1301 in which an artificial intelligence model is executed, or performed via a separate server (e.g., the server 1308). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The AI model may additionally or alternatively include a software structure other than the hardware structure.

The memory 1330 may store various data used by at least one component (e.g., the processor 1320 or the sensor module 1376) of the electronic device 1301. The various data may include, for example, software (e.g., the program 1340) and input data or output data for a command related thereto. The memory 1330 may include the volatile memory 1332 or the non-volatile memory 1334.

The program 1340 may be stored as software in the memory 1330, and may include, for example, an operating system (OS) 1342, middleware 1344, or an application 1346.

The input module 1350 may receive a command or data to be used by another component (e.g., the processor 1320) of the electronic device 1301, from the outside (e.g., a user) of the electronic device 1301. The input module 1350 may include, for example, a microphone, a mouse, a keyboard, a key (e.g., a button), or a digital pen (e.g., a stylus pen).

The sound output module 1355 may output a sound signal to the outside of the electronic device 1301. The sound output module 1355 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 1360 may visually provide information to the outside (e.g., a user) of the electronic device 1301. The display module 1360 may include, for example, a control circuit for controlling a display, a hologram device, or a projector and control circuitry to control a corresponding one of the display, the hologram device, and the projector. According to an embodiment, the display module 1360 may include a touch sensor adapted to detect a touch, or a pressure sensor adapted to measure the intensity of force incurred by the touch.

The audio module 1370 may convert a sound into an electrical signal or vice versa. According to an embodiment, the audio module 1370 may obtain the sound via the input module 1350 or output the sound via the sound output module 1355 or an external electronic device (e.g., the electronic device 1302 such as a speaker or a headphone) directly or wirelessly connected to the electronic device 1301.

The sensor module 1376 may detect an operational state (e.g., power or temperature) of the electronic device 1301 or an environmental state (e.g., a state of a user) external to the electronic device 1301, and generate an electric signal or data value corresponding to the detected state. According to an embodiment, the sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device (e.g., the electronic device 1302) directly (e.g., by wire) or wirelessly. According to an embodiment, the interface 1377 may include, for example, a high-definition multimedia interface (HDMI), a universal serial bus (USB) interface, a secure digital (SD) card interface, or an audio interface.

The connecting terminal 1378 may include a connector via which the electronic device 1301 may be physically connected to an external electronic device (e.g., the electronic device 1302). According to an embodiment, the connecting terminal 1378 may include, for example, an HDMI connector, a USB connector, an SD card connector, or an audio connector (e.g., a headphone connector).

The haptic module 1379 may convert an electrical signal into a mechanical stimulus (e.g., a vibration or a movement) or an electrical stimulus which may be recognized by a user via tactile sensation or kinesthetic sensation. According to an embodiment, the haptic module 1379 may include, for example, a motor, a piezoelectric element, or an electric stimulator.

The camera module 1380 may capture a still image and moving images. According to an embodiment, the camera module 1380 may include one or more lenses, image sensors, image signal processors, or flashes.

The power management module 1388 may manage power supplied to the electronic device 1301. According to an embodiment, the power management module 1388 may be implemented as, for example, at least a part of a power management integrated circuit (PMIC).

The battery 1389 may supply power to at least one component of the electronic device 1301. According to an embodiment, the battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the electronic device 1302, the electronic device 1304, or the server 1308) and performing communication via the established communication channel. The communication module 1390 may include one or more communication processors that are operable independently of the processor 1320 (e.g., an AP) and that support a direct (e.g., wired) communication or a wireless communication. According to an embodiment, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module, or a power line communication (PLC) module). A corresponding one of these communication modules may communicate with the external electronic device 1304 via the first network 1398 (e.g., a short-range communication network, such as Bluetooth™, Wi-Fi direct, or infrared data association (IrDA)) or the second network 1399 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 1392 may identify and authenticate the electronic device 1301 in a communication network, such as the first network 198 or the second network 1399, using subscriber information (e.g., international mobile subscriber identity (IMSI)) stored in the SIM 1396.

The wireless communication module 1392 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1392 may support a high-frequency band (e.g., a mmWave band) to achieve, e.g., a high data transmission rate. The wireless communication module 1392 may support various technologies for securing performance on a high-frequency band, such as, e.g., beamforming, massive multiple-input and multiple-output (massive MIMO), full dimensional MIMO (FD-MIMO), an array antenna, analog beam-forming, or a large scale antenna. The wireless communication module 1392 may support various requirements specified in the electronic device 1301, an external electronic device (e.g., the electronic device 1304), or a network system (e.g., the second network 1399). According to an embodiment, the wireless communication module 1392 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1397 may transmit or receive a signal or power to or from the outside (e.g., the external electronic device) of the electronic device 101. According to an embodiment, the antenna module 1397 may include an antenna including a radiating element including a conductive material or a conductive pattern formed in or on a substrate (e.g., a printed circuit board (PCB)). According to an embodiment, the antenna module 1397 may include a plurality of antennas (e.g., array antennas). In such a case, at least one antenna appropriate for a communication scheme used in a communication network, such as the first network 1398 or the second network 1399, may be selected by, for example, the communication module 1390 from the plurality of antennas. The signal or power may be transmitted or received between the communication module 1390 and the external electronic device via the at least one selected antenna. According to an embodiment, another component (e.g., a radio frequency integrated circuit (RFIC)) other than the radiating element may be additionally formed as a part of the antenna module 1397.

According to an embodiment, the antenna module 1397 may form a mmWave antenna module. According to an embodiment, the mmWave antenna module may include a PCB, an RFIC disposed on a first surface (e.g., a bottom surface) of the PCB or adjacent to the first surface and capable of supporting a designated high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1301 and the external electronic device 1304 via the server 1308 coupled with the second network 1399. Each of the external electronic devices 1302 or 1304 may be a device of the same type as or a different type from the electronic device 1301. According to an embodiment, all or some of operations to be executed by the electronic device 1301 may be executed at one or more of the external electronic devices 1302 and 1304, and the server 1308. For example, if the electronic device 1301 needs to perform a function or a service automatically, or in response to a request from a user or another device, the electronic device 1301, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 1301. The electronic device 1301 may provide the outcome, with or without further processing of the outcome, as at least part of a reply to the request. To that end, a cloud computing, distributed computing, mobile edge computing (MEC), or client-server computing technology may be used, for example. The electronic device 1301 may provide ultra low-latency services using, e.g., distributed computing or mobile edge computing. In an embodiment, the external electronic device 1304 may include an Internet-of-things (IoT) device. The server 1308 may be an intelligent server using machine learning and/or a neural network. According to an embodiment, the external electronic device 1304 or the server 1308 may be included in the second network 1399. The electronic device 1301 may be applied to intelligent services (e.g., smart home, smart city, smart car, or healthcare) based on 5G communication technology or IoT-related technology.

In various example embodiments, an electronic device 201 or 1301 may include at least one wireless communication module 1392 configured to transmit and receive a wireless signal, at least one processor 1320 operatively connected with the wireless communication module, and a memory 1330 electrically connected to the processor and configured to store instructions executable by the processor. When the instructions are executed by the processor 1320, the processor 1320 may be configured to obtain information for a Wi-Fi P2P connection to a second external electronic device 401 while the electronic device 201 or 1301 forms a first P2P group 405 with a first external electronic device 203 through a Wi-Fi P2P connection. When the instructions are executed by the processor 1320, the processor 1320 may be configured to generate a second P2P group 412 with the second external electronic device 401 by obtaining a GO permission while maintaining the first P2P group 405 based on the information and a role of the electronic device 201 or 1301 in the first P2P group 405.

In an example embodiment, the processor 1320 may be configured to generate the second P2P group 415 when the role of the electronic device 201 or 1301 is a GC in the first P2P group 405.

In an example embodiment, the processor 1320 may be configured to generate the second P2P group 415 when a role of the electronic device 201 or 1301 in the first P2P group 405 is a GO and both of the electronic device 201 or 1301 and the second external electronic device 401 support a second frequency band that is higher than a first frequency band of a channel of the first P2P group 405.

In an example embodiment, the processor 1320 may be configured to, when the second external electronic device 401 forms a third P2P group 805, generate the second P2P group 415 based on a first role of the electronic device 201 or 1301 in the first P2P group 405 and a second role of the second external electronic device 401 in the third P2P group 805.

In an example embodiment, the processor may be configured to, when the first role is a GC and the second role is a GC, generate the second P2P group 415.

In an example embodiment, the processor 1320 may be configured to, when the first role is a GO and the second role is a GO or a GC, generate the second P2P group 415 based on a frequency band of a channel of the first P2P group 405, a frequency band of a channel of the third P2P group 805, and a frequency band supported by both of the electronic device 201 or 1301 and the second external electronic device 401.

In an example embodiment, the processor 1320 may be configured to, when the electronic device 201 or 1301 is connected to a Wi-Fi AP 1001, generate the second P2P group 415 based on an operation channel of the first P2P group 405 and a connection channel between the electronic device 201 or 1301 and the Wi-Fi AP 1001.

In an example embodiment, the processor 1320 may be configured to, when a first frequency band of the operation channel is different from a second frequency band of the connection channel, select a channel of a higher frequency band from the operation channel and the connection channel to be an operation channel of the second P2P group 415. When the first frequency band is the same as the second frequency band and the operation channel is different from the connection channel, select the operation channel of the second P2P group 415 based on a remaining time of a P2P service of the first P2P group.

In an example embodiment, the processor 1320 may be configured to, when the remaining time is less than a threshold, select the connection channel to be the operation channel of the second P2P group 415. The processor 1320 may be configured to, when the remaining time is greater than or equal to the threshold, select a channel that maintains a slower speed from the operation channel and the connection channel to be the operation channel of the second P2P group 415.

In an example embodiment, the processor 1320 may be configured to activate the operation channel of the second P2P group 415 in an active section of NoA.

In various example embodiments, a method of forming a Wi-Fi P2P group of an electronic device 201 or 1301 may include obtaining information for Wi-Fi P2P connection to a second external electronic device 401 while the electronic device 201 or 1301 forms a first P2P group 405 with a first external electronic device 203 through a Wi-Fi P2P connection and generating a second P2P group 412 with the second external electronic device 401 by obtaining a GO permission while maintaining the first P2P group 405 based on the information and a role of the electronic device 201 or 1301 in the first P2P group 405.

In an example embodiment, the generating may include generating the second P2P group 415 when the role of the electronic device 201 or 1301 is a GC in the first P2P group 405.

In an example embodiment, the generating may include generating the second P2P group 415 when a role of the electronic device 201 or 1301 in the first P2P group 405 is a GO and both of the electronic device 201 or 1301 and the second external electronic device 401 support a second frequency band that is higher than a first frequency band of a channel of the first P2P group 405.

In an example embodiment, when the second external electronic device 401 forms a third P2P group 805, the generating may include generating the second P2P group 415 based on a first role of the electronic device 201 or 1301 in the first P2P group 405 and a second role of the second external electronic device 401 in the third P2P group 805.

In an example embodiment, the generating of the second P2P group 415 based on the role of the second external electronic device 401 in the third P2P group 805 and the role of the electronic device 201 or 1301 in the first P2P group 405 may include, when the first role is a GC and the second role is a GC, generating the second P2P group 415.

In an example embodiment, the generating of the second P2P group 415 based on the role of the second external electronic device 401 in the third P2P group 805 and the role of the electronic device 201 or 1301 in the first P2P group 405 may include, when the first role is a GO and the second role is a GO or a GC, generating the second P2P group 415 based on a frequency band of a channel of the first P2P group 405, a frequency band of a channel of the third P2P group 805, and a frequency band supported by both of the electronic device 201 or 1301 and the second external electronic device 401.

In an example embodiment, when the electronic device 201 or 1301 is connected to the Wi-Fi AP 1001, the generating may include generating the second P2P group 415 based on an operation channel of the first P2P group 405 and a connection channel between the electronic device 201 or 1301 and the Wi-Fi AP 1001.

In an example embodiment, the generating of the second P2P group 415 based on an operation channel of the first P2P group 405 and a connection channel between the electronic device 201 or 1301 and the Wi-Fi AP 1001 may include, when a first frequency band of the operation channel is different from a second frequency band of the connection channel, selecting a channel of a higher frequency band from the operation channel and the connection channel to be an operation channel of the second P2P group 415, and when the first frequency band is the same as the second frequency band and the operation channel is different from the connection channel, selecting the operation channel of the second P2P group 415 based on a remaining time of a P2P service of the first P2P group.

In an example embodiment, the selecting of the operation channel of the second P2P group 415 based on the remaining time may include, when the remaining time is less than a threshold, selecting the connection channel to be the operation channel of the second P2P group 415, and, when the remaining time is greater than or equal to the threshold, selecting a channel that maintains a slower speed from the operation channel and the connection channel to be the operation channel of the second P2P group 415.

In an example embodiment, the method may further include activating the operation channel of the second P2P group 415 in an active section of NoA.

The electronic device according to the embodiments disclosed herein may be one of various types of electronic devices. The electronic device may include, for example, a portable communication device (e.g., a smart phone), a computer device, a portable multimedia device, a portable medical device, a camera, a wearable device, a home appliance device, or the like. According to an embodiment of the disclosure, the electronic device is not limited to those described above.

It should be understood that an embodiment of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wired), wirelessly, or via a third element.

As used in connection with an embodiment of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment as set forth herein may be implemented as software (e.g., the program 1340) including one or more instructions that are stored in a storage medium (e.g., an internal memory 1336 or an external memory 1338) that is readable by a machine (e.g., the electronic device 1301). For example, a processor (e.g., the processor 1320) of the machine (e.g., the electronic device 1301) may invoke at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply refers to the storage medium being a tangible device, and does not include a signal (e.g., an electromagnetic wave), but this term does not differentiate between data being semi-permanently stored in the storage medium and data being temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as a memory of the manufacturer's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   at least one wireless communication module, including wireless communication circuitry, configured to transmit and receive a wireless signal;
   at least one processor operatively connected with the wireless communication module; and
   memory electrically connected to the at least one processor and configured to store instructions executable by the at least one processor,
   wherein, when the instructions are executed by the at least one processor, the at least one processor is configured to:
   obtain information for a wireless fidelity (Wi-Fi) peer to peer (P2P) connection to a second external electronic device while the electronic device forms a first P2P group with a first external electronic device through the Wi-Fi P2P connection, and
   generate a second P2P group with the second external electronic device by obtaining a group owner (GO) permission while maintaining the first P2P group based on the information and a role of the electronic device in the first P2P group,
   wherein the at least one processor is further configured to:
   when the electronic device is connected to a Wi-Fi access point (AP), generate the second P2P group based on an operation channel of the first P2P group and a connection channel between the electronic device and the Wi-Fi AP,
   when a first frequency band of the operation channel is different from a second frequency band of the connection channel, select a channel of a higher frequency band from the operation channel and the connection channel to be an operation channel of the second P2P group, and
   when the first frequency band is the same as the second frequency band and the operation channel is different from the connection channel, select the operation channel of the second P2P group based on a remaining time of a P2P service of the first P2P group.

2. The electronic device of claim 1, wherein the at least one processor is further configured to:
   generate the second P2P group when the role of the electronic device is a group client (GC) in the first P2P group.

3. The electronic device of claim 1, wherein the at least one processor is further configured to:
   generate the second P2P group when the role of the electronic device in the first P2P group is a GO and both of the electronic device and the second external electronic device support a second frequency band that is higher than a first frequency band of a channel of the first P2P group.

4. The electronic device of claim 1, wherein the at least one processor is further configured to:
   when the second external electronic device forms a third P2P group, generate the second P2P group based on a first role of the electronic device in the first P2P group and a second role of the second external electronic device in a third P2P group.

5. The electronic device of claim 4, wherein the at least one processor is further configured to:
   when the first role is a GC and the second role is a GC, generate the second P2P group.

6. The electronic device of claim 4, wherein the at least one processor is further configured to:
   when the first role is a GO and the second role is a GO or a GC, generate the second P2P group based on a frequency band of a channel of the first P2P group, a frequency band of a channel of the third P2P group, and a frequency band supported by both of the electronic device and the second external electronic device.

7. The electronic device of claim 1, wherein the at least one processor is further configured to:
   when the remaining time is less than a threshold, select the connection channel to be the operation channel of the second P2P group, and
   when the remaining time is greater than or equal to the threshold, select a channel that maintains a slower speed from the operation channel and the connection channel to be the operation channel of the second P2P group.

8. The electronic device of claim 1, wherein the at least one processor is further configured to:
   activate the operation channel of the second P2P group in an active section of a notice of absence (NoA).

9. A method of forming a wireless fidelity (Wi-Fi) peer to peer (P2P) group of an electronic device, the method comprising:

obtaining information for Wi-Fi P2P connection to a second external electronic device while the electronic device forms a first P2P group with a first external electronic device through the Wi-Fi P2P connection; and generating a second P2P group with the second external electronic device by obtaining a group owner (GO) permission while maintaining the first P2P group based on the information and a role of the electronic device in the first P2P group, wherein, when the electronic device is connected to a Wi-Fi access point (AP), the generating comprises:
  generating the second P2P group based on an operation channel of the first P2P group and a connection channel between the electronic device and the Wi-Fi AP, and wherein the generating of the second P2P group based on an operation channel of the first P2P group and a connection channel between the electronic device and the Wi-Fi AP comprises:
  when a first frequency band of the operation channel is different from a second frequency band of the connection channel, selecting a channel of a higher frequency band from the operation channel and the connection channel to be an operation channel of the second P2P group, and
  when the first frequency band is the same as the second frequency band and the operation channel is different from the connection channel, selecting the operation channel of the second P2P group based on a remaining time of a P2P service of the first P2P group.

10. The method of claim 9, wherein the generating comprises:
  generating the second P2P group when the role of the electronic device is a group client (GC) in the first P2P group.

11. The method of claim 9, wherein the generating comprises:
  generating the second P2P group when the role of the electronic device in the first P2P group is a GO and both of the electronic device and the second external electronic device support a second frequency band that is higher than a first frequency band of a channel of the first P2P group.

12. The method of claim 9, wherein, when the second external electronic device forms a third P2P group, the generating comprises:
  generating the second P2P group based on a first role of the electronic device in the first P2P group and a second role of the second external electronic device in the third P2P group.

13. The method of claim 12, wherein the generating of the second P2P group based on the role of the second external electronic device in the third P2P group and the role of the electronic device in the first P2P group comprises:
  when the first role is a GC and the second role is a GC, generating the second P2P group.

14. The method of claim 12, wherein the generating of the second P2P group based on the role of the second external electronic device in the third P2P group and the role of the electronic device in the first P2P group comprises:
  when the first role is a GO and the second role is a GO or a GC, generating the second P2P group based on a frequency band of a channel of the first P2P group, a frequency band of a channel of the third P2P group, and a frequency band supported by both of the electronic device and the second external electronic device.

15. The method of claim 9, wherein the selecting of the operation channel of the second P2P group based on the remaining time comprises:
  when the remaining time is less than a threshold, selecting the connection channel to be the operation channel of the second P2P group, and
  when the remaining time is greater than or equal to the threshold, selecting a channel that maintains a slower speed from the operation channel and the connection channel to be the operation channel of the second P2P group.

16. The method of claim 9, further comprising:
  activating the operation channel of the second P2P group in an active section of a notice of absence (NoA).

* * * * *